US011570870B2

(12) United States Patent
Takahashi et al.

(10) Patent No.: US 11,570,870 B2
(45) Date of Patent: Jan. 31, 2023

(54) ELECTRONIC DEVICE AND INFORMATION PROVISION SYSTEM

(71) Applicant: SONY GROUP CORPORATION, Tokyo (JP)

(72) Inventors: Tomoko Takahashi, Tokyo (JP); Takamoto Tsuda, Tokyo (JP); Daisuke Iseki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/288,261

(22) PCT Filed: Sep. 18, 2019

(86) PCT No.: PCT/JP2019/036513
§ 371 (c)(1),
(2) Date: Apr. 23, 2021

(87) PCT Pub. No.: WO2020/090266
PCT Pub. Date: May 7, 2020

(65) Prior Publication Data
US 2021/0385927 A1  Dec. 9, 2021

(30) Foreign Application Priority Data
Nov. 2, 2018  (JP) .............................. JP2018-207596

(51) Int. Cl.
*H05B 47/115* (2020.01)
*H04R 1/02* (2006.01)
*H04R 3/00* (2006.01)

(52) U.S. Cl.
CPC .......... *H05B 47/115* (2020.01); *H04R 1/028* (2013.01); *H04R 3/00* (2013.01)

(58) Field of Classification Search
CPC ....... H05B 47/115; H05B 47/12; H04R 1/028
See application file for complete search history.

(56) References Cited

U.S. PATENT DOCUMENTS

2005/0057528 A1\* 3/2005 Kleen .................. G09B 21/003
345/173
2005/0132819 A1\* 6/2005 Johnson ................... G01N 3/04
73/862.541

(Continued)

FOREIGN PATENT DOCUMENTS

CN  102622850 A  8/2012
DE  10340188 A1  4/2005

(Continued)

OTHER PUBLICATIONS

International Search Report and Written Opinion of PCT Application No. PCT/JP2019/036513, dated Oct. 21, 2019, 11 pages of ISRWO.

*Primary Examiner* — Abdullah A Riyami
*Assistant Examiner* — Syed M Kaiser
(74) *Attorney, Agent, or Firm* — Chip Law Group

(57) ABSTRACT

An electronic device included in an information transmitting unit includes: a deformation interface configured to change in shape by receiving an external force; an external force sensor configured to detect an external force applied to the deformation interface; and an information transmitting unit configured to transmit information in accordance with the external force detected by the external force sensor.

17 Claims, 26 Drawing Sheets

(56) References Cited

U.S. PATENT DOCUMENTS

| | | | | |
|---|---|---|---|---|
| 2009/0250267 A1* | 10/2009 | Heubel | ............... | G06F 3/04886 178/18.03 |
| 2010/0003904 A1* | 1/2010 | Duescher | .............. | B24B 37/245 51/293 |
| 2012/0194554 A1* | 8/2012 | Kaino | .............. | G08B 13/19613 345/633 |

FOREIGN PATENT DOCUMENTS

| | | | |
|---|---|---|---|
| JP | 2005-078644 A | 3/2005 | |
| JP | 2011-519082 A | 6/2011 | |
| JP | 2012-155655 A | 8/2012 | |
| JP | 2012-203798 A | 10/2012 | |
| KR | 10-2010-0136983 A | 12/2010 | |
| WO | 2009/123769 A1 | 10/2009 | |

* cited by examiner

ELECTRONIC DEVICE AND INFORMATION PROVISION SYSTEM

CROSS REFERENCE TO RELATED APPLICATIONS

This application is a U.S. National Phase of International Patent Application No. PCT/JP2019/036513 filed on Sep. 18, 2019, which claims priority benefit of Japanese Patent Application No. JP 2018-207596 filed in the Japan Patent Office on Nov. 2, 2018. Each of the above-referenced applications is hereby incorporated herein by reference in its entirety.

TECHNICAL FIELD

The technique according to the present disclosure (the present technique) relates to, for example, an electronic device used in a switch for operating a lighting apparatus or the like and to an information provision system that includes the electronic device.

BACKGROUND ART

There are electronic devices which, for example, as disclosed in PTL 1, when a branch point exists in information to be presented, transmit the branch point of information to a user operating a deformation interface by changing a shape of the deformation interface.

CITATION LIST

Patent Literature

[PTL 1]
JP 2012-203798 A

SUMMARY

Technical Problem

However, with the technique disclosed in PTL 1, an operation of the deformation interface by the user and feedback of a result of the user operating the deformation interface are independent of each other. Therefore, there is a problem that the result of the user operating the deformation interface must be determined based on visual information or the like.

The present technique takes the problem described above into consideration and an object is to provide an electronic device capable of feeding back a result of a user operating a deformation interface to the user as needed and an information provision system that includes the electronic device.

Solution to Problem

An electronic device according to an aspect of the present technique includes: a deformation interface configured to change in shape by receiving an external force; an external force sensor configured to detect an external force applied to the deformation interface; and an information transmitting unit configured to transmit information in accordance with the external force detected by the external force sensor.

An information provision system according to an aspect of the present technique includes: a deformation interface; an external force sensor; and an information transmitting unit. The deformation interface forms a switch for operating an operation target device being a device to be a control target, and a shape of the deformation interface changes by receiving an external force. The external force sensor is configured to detect an external force applied to the deformation interface. The information transmitting unit is configured to transmit, to a user, information in accordance with the external force detected by the external force sensor.

An information provision system according to an aspect of the present technique includes: a deformation interface; an external force sensor; a state changing unit; a state change control unit; and a detection apparatus. The deformation interface forms a switch for operating an operation target device being a device to be a control target, and a shape of the deformation interface changes by receiving an external force. The external force sensor is configured to detect an external force applied to the deformation interface. The state changing unit is configured to change the shape of the deformation interface. The state change control unit is configured to control an operation of the state changing unit. The detection apparatus is configured to detect an object existing in a range set in advance in a periphery of the deformation interface. In addition, the state change control unit is configured to operate the state changing unit so as to change stiffness of the deformation interface in accordance with at least one of an external force detected by the external force sensor and an object detected by the detection apparatus.

An information provision system according to an aspect of the present technique includes: a deformation interface; an external force sensor; a state changing unit; a state change control unit; a dimming unit; and a light emission control unit. The deformation interface is configured to form a switch for setting, with respect to a temperature regulating apparatus capable of changing a temperature of a fluid to be supplied, a temperature of the fluid, and a shape of the deformation interface changes by receiving an external force. The external force sensor is configured to detect an external force applied to the deformation interface. The state changing unit is configured to change the shape of the deformation interface. The state change control unit is configured to control an operation of the state changing unit. The dimming unit is capable of changing a state of light emission of the deformation interface. The light emission control unit is configured to control the state of light emission in accordance with the set temperature.

An information provision system according to an aspect of the present technique includes: a plurality of deformation interfaces; an external force sensor; a state changing unit; and a state change control unit. The plurality of deformation interfaces are arranged in a grid pattern on a flat surface set in advance, and shapes of the deformation interfaces change by receiving an external force. The external force sensor is configured to detect an external force applied to the deformation interfaces. The state changing unit is configured to cause the shape of the deformation interfaces to change. The state change control unit is configured to control an operation of the state changing unit. In addition, at least one of the plurality of deformation interfaces is configured to form a switch for operating an operation target device being a device to be a control target. Furthermore, the state change control unit is configured to control, in accordance with an option of the operation, an operation of the state changing unit so that the plurality of deformation interfaces being arranged in a grid pattern cause a user of the device to recognize a graphic.

An information provision system according to an aspect of the present technique includes: a deformation interface; a state changing unit; a state change control unit; and a proximity sensor. The deformation interface is arranged on a flat surface set in advance in a state where a surface that is flush with the flat surface is formed, and a shape of the deformation interface changes by receiving an external force. The state changing unit is configured to change the shape of the deformation interface. The state change control unit is configured to control an operation of the state changing unit. The proximity sensor is configured to detect an object that approaches the deformation interface. In addition, the state change control unit is configured to control an operation of the state changing unit so that the deformation interface protrudes from the flat surface when the proximity sensor detects the object. Furthermore, the protruding deformation interface is configured to form a switch for operating an operation target device being a device to be a control target.

DESCRIPTION OF EMBODIMENTS

Hereinafter, embodiments of the present technique will be described with reference to drawings. In the descriptions of the drawings, same or similar portions are denoted by same or similar reference signs and overlapping descriptions will be omitted. The respective drawings are schematic and include cases that differ from reality. The embodiments presented below merely exemplify apparatuses and methods for implementing the technical ideas of the present technique and, as such, the technical ideas of the present technique are not limited to the apparatuses and methods exemplified in the following embodiments. Various modifications can be made to the technical ideas of the present technique within the technical scope described in the scope of claims

First Embodiment

<Overall Configuration of Electronic Device and Information Provision System>

Figure 1:
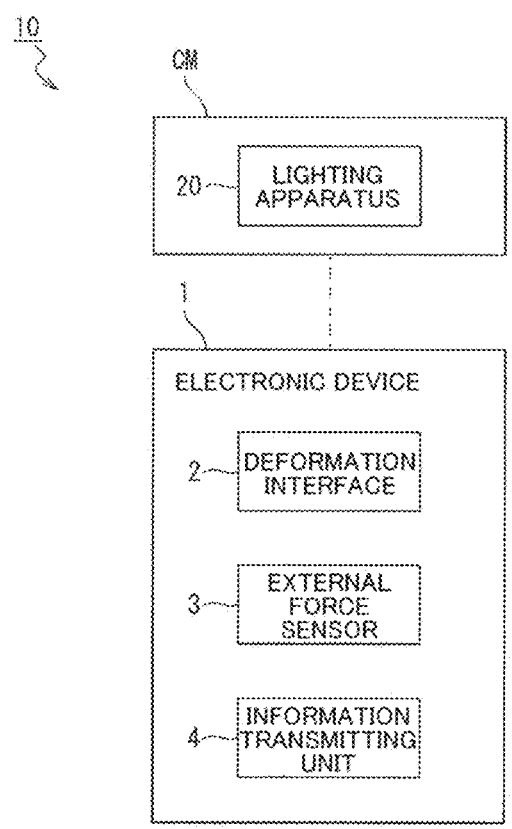
FIG. 1 is a block diagram showing a configuration of an information provision system according to a first embodiment.

As shown in FIG. 1, an electronic device 1 according to the first embodiment is built into an information provision system 10.

Figure 2:
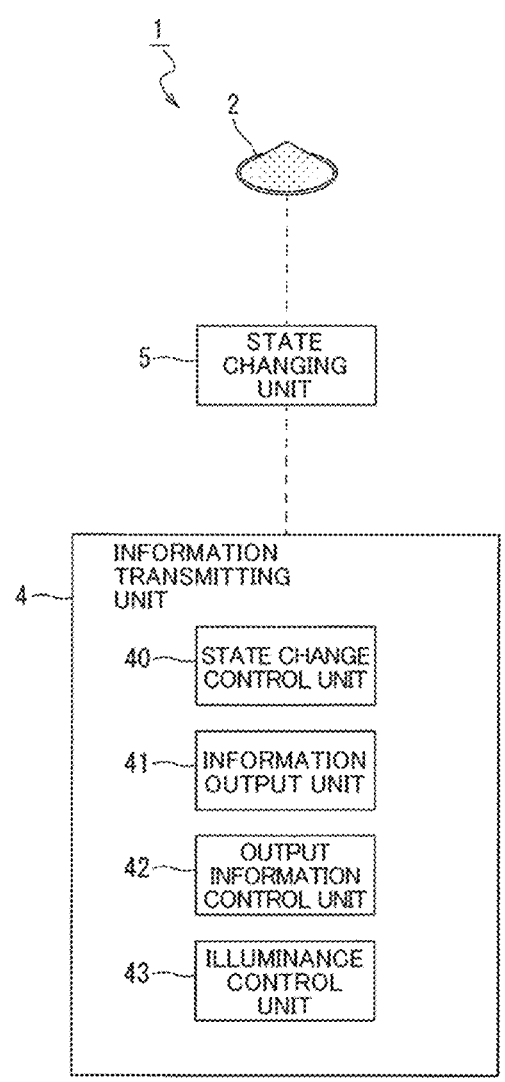
FIG. 2 is a diagram showing a configuration of an electronic device according to the first embodiment.

As shown in FIGS. 1 and 2, the electronic device 1 has a deformation interface 2, an external force sensor 3, and an information transmitting unit 4.

The deformation interface 2 is formed using a material having elasticity such as a sheet formed by silicone with light permeability such that a shape of the deformation interface 2 changes under external force. In addition, the deformation interface 2 forms a switch for operating an operation target device CM being a device to be a control target. The deformation interface 2 exhibits a function as the switch when being pressed by a hand or the like of a user of the operation target device CM. The operation target device CM includes a lighting apparatus 20.

For example, the lighting apparatus 20 is arranged on a ceiling surface or a wall surface inside a room and enables illuminance of emitted light to be changed.

Figure 3:
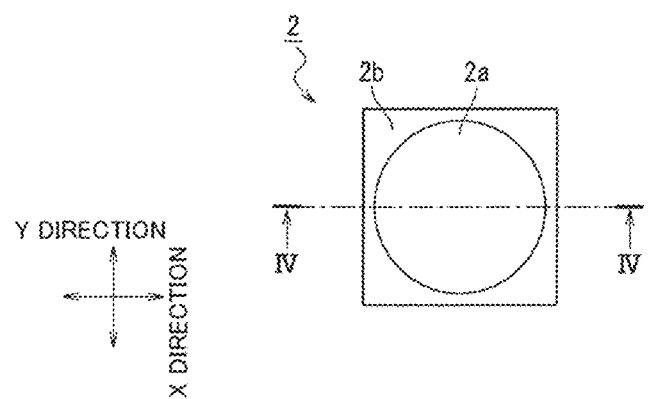
FIG. 3 is a plan view of a deformation interface.

In the first embodiment, for example, as shown in FIG. 3, a case will be described in which the deformation interface 2 has a shape which includes a deforming portion 2a that is a circular portion and a flat plate portion 2b that is a square portion formed around the deforming portion 2a as viewed from a thickness direction of the sheet. The thickness direction of the sheet is a vertical direction in FIG. 2.

In addition, a state changing unit 5 that changes a state of only the deforming portion 2a among the deformation interface 2 is connected to the deformation interface 2.

For example, the state changing unit 5 is formed so as to include an air pump and changes the state of the deforming portion 2a (at least one of stiffness and a shape of the deforming portion 2a) using a fluid (a gas).

The external force sensor 3 is formed using, for example, a mechanical pressure sensor.

The pressure sensor included in the external force sensor 3 is configured to detect an external force applied to the deformation interface 2. The external force detected by the pressure sensor is output to the information transmitting unit 4.

In other words, the external force sensor 3 formed using a mechanical pressure sensor directly detects an external force applied to the deformation interface 2. In addition, the external force sensor 3 formed using a mechanical pressure sensor is capable of detecting coordinates subjected to an external force along a Z direction that is perpendicular to an X direction and a Y direction shown in FIG. 3.

Figure 4:
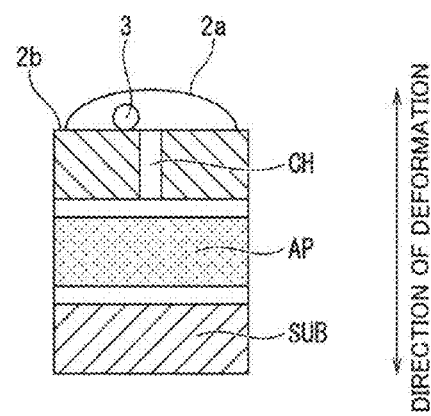
FIG. 4 is a sectional view taken along IV-IV in FIG. 3.

Furthermore, for example, the external force sensor 3 is arranged inside the deforming portion 2a as shown in FIG. 4. It should be noted that FIG. 4 shows a state where the deforming portion 2a has deformed to a dome shape by bulging from a flat plate shape. Shapes to which the deforming portion 2a deforms by bulging from a flat plate shape include a dome shape and a conical shape.

In addition, FIG. 4 shows an air pump AP and a flow channel CH that communicates the air pump AP and an inner surface (in FIG. 4, a lower surface) of the deforming portion 2a with each other. Furthermore, FIG. 4 also shows a substrate SUB that supports the air pump AP and the deformation interface 2. The air pump AP forms a state changing unit 5 configured to change a state of the deforming portion 2a by supplying air to the deforming portion 2a.

The external force sensor 3 formed using a mechanical pressure sensor is capable of detecting an external force along the Z direction that is parallel to a direction of deformation shown in FIG. 4 as a binary of on or off.

Hereinafter, an example of a shape to which the deforming portion 2a deforms is shown in FIGS. 5A, 5B, 5C, and 5D.

Figure 5A:
FIG. 5A is a diagram representing a state where the deformation interface deforms.
Figure 5B:
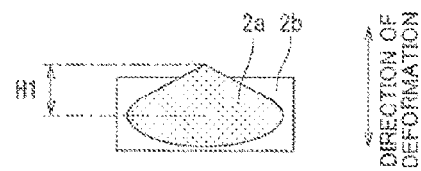
FIG. 5B is a diagram representing a state where the deformation interface deforms.
Figure 5C:
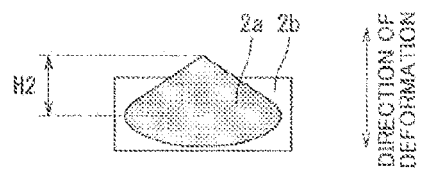
FIG. 5C is a diagram representing a state where the deformation interface deforms.
Figure 5D:
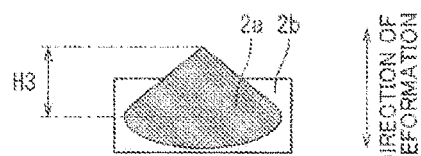
FIG. 5D is a diagram representing a state where the deformation interface deforms.

With respect to the deforming portion 2a with a flat plate shape shown in FIG. 5A, when air is supplied inside the deforming portion 2a from the air pump AP through the flow channel CH, the deforming portion 2a deforms to a conical shape with a height of H1 by bulging as shown in FIG. 5B. When air is further supplied inside the deforming portion 2a from the state shown in FIG. 5B, as shown in FIG. 5C, an amount of deformation of the deforming portion 2a increases and the height of the deforming portion 2a changes from H1 to a greater height of H2. When air is further supplied inside the deforming portion 2a from the state shown in FIG. 5C, as shown in FIG. 5D, the amount of deformation of the deforming portion 2a increases and the height of the deforming portion 2a changes from H2 to a greater height of H3.

When the supply of air to the deforming portion 2a is suspended and, further, a valve of the air pump AP arranged outside of the diagram is opened, a restoring force is generated in the deforming portion 2a and the amount of deformation of the deforming portion 2a decreases. Accordingly, the height of the deforming portion 2a decreases (H3→H2→H1→0).

As shown in FIG. 5A, in a state where the deforming portion 2a has a flat plate shape (the height is "0"), since the sheet that forms the deformation interface 2 is a flat surface, a state is created where the deformation interface 2 does not obstruct the user of the operation target device CM.

In FIGS. 5A, 5B, 5C, and 5D, a direction in which the deforming portion 2a deforms is denoted by a bidirectional arrow as "direction of deformation".

The information transmitting unit 4 is constituted by, for example, a CPU and a memory, and includes a state change control unit 40, an information output unit 41, an output information control unit 42, and an illuminance control unit 43.

The state change control unit 40 controls an operation of the state changing unit 5 in accordance with an external force detected by the external force sensor 3. Specifically, in a state where the inside of a room in which the lighting apparatus 20 is arranged is dark (in a state where the lighting apparatus 20 is not emitting light), when the external force sensor 3 detects an external force, a height of the deformation interface 2 (the deforming portion 2a) is increased. In this case, since the deformation interface 2 constitutes a switch for operating the lighting apparatus 20, in a state where the lighting apparatus 20 is not emitting light, illuminance of the lighting apparatus 20 increases when the external force sensor 3 detects an external force (when the user operates the deformation interface 2). Accordingly, the state change control unit 40 increases the height of the deformation interface 2 such that the greater the increase in illuminance of the lighting apparatus 20, the greater the height. In addition, the height of the deformation interface 2 is increased such that the greater the increase in illuminance of the lighting apparatus 20, the greater a stiffness of the deformation interface 2.

Therefore, by providing the user operating the deformation interface 2 with feedback in the form of changes in the height and the stiffness, the state change control unit 40 provides the user with a result of an operation for changing the illuminance of the lighting apparatus 20.

Furthermore, after the illuminance of the lighting apparatus 20 has increased to a maximum value and the height of the deformation interface 2 has increased to a maximum value, the state change control unit 40 performs control for shrinking the bulge of the deformation interface 2 in a short period of time. Accordingly, by providing the user operating the deformation interface 2 with feedback in the form of vibration, the state change control unit 40 provides the user with a result of an operation for increasing the illuminance of the lighting apparatus 20 to a maximum value.

Moreover, for example, after the height of the deformation interface 2 has increased to a maximum value, control for increasing the stiffness of the deformation interface 2 can be performed.

As described above, the state change control unit 40 controls an operation of the state changing unit 5 in accordance with an external force detected by the external force sensor 3 so as to provide the user with information that feeds back a result of operating the lighting apparatus 20.

Figure 6:
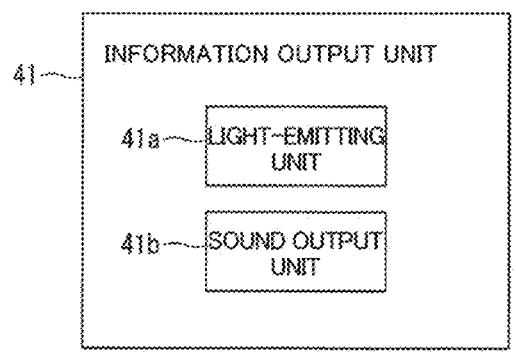
FIG. 6 is a block diagram showing a configuration of an information output unit.

As shown in FIG. 6, the information output unit 41 includes a light-emitting unit 41a and a sound output unit 41b.

The light-emitting unit 41a is formed using, for example, an LED and is capable of changing a state of light emission.

In addition, the light-emitting unit 41a is arranged inside the deformation interface 2 (the deforming portion 2a) in a state where a direction of light emission is oriented toward outside of the deformation interface 2.

The sound output unit 41b is formed using, for example, a speaker and is capable of outputting sound.

In addition, the sound output unit 41b is arranged in, for example, the flat plate portion 2b among the deformation interface 2.

By controlling the state of light emission of the light-emitting unit 41a and sound output from the sound output unit 41b, the output information control unit 42 controls the information output unit 41 to output information that enables an operation of the operation target device CM (the lighting apparatus 20) being a control target to be predicted or information in accordance with an operation of the device.

Information that enables an operation of a device being a control target to be predicted is, for example, by causing the light-emitting unit 41a to emit light in a state where the lighting apparatus 20 is not emitting light, information that visually transmits the fact that operating the deformation interface 2 causes the lighting apparatus 20 to emit light to the user.

Information in accordance with an operation of the device is, for example, in a state where the user has operated the deformation interface 2 and the lighting apparatus 20 is emitting light, information for further outputting speech such as "Continue operation to make the room brighter".

In other words, information in accordance with an operation of the device is information indicating an operation to be performed by the operation target device CM as a result of the user's operation of the deformation interface 2.

As described above, the information output unit 41 outputs, via the light-emitting unit 41a and the sound output unit 41b, information in accordance with an external force detected by the external force sensor 3.

The illuminance control unit 43 controls illuminance of light emitted by the lighting apparatus 20 in accordance with an external force detected by the external force sensor 3.

In other words, the external force detected by the external force sensor 3 includes a length of time during which the external force is applied to the deformation interface 2 by the user by operating the deformation interface 2.

In addition, the illuminance control unit 43 controls the illuminance of light emitted by the lighting apparatus 20 in accordance with an external force detected by the external force sensor 3 so as to provide the user of the lighting apparatus 20 with information that feeds back a result of operating the lighting apparatus 20. Information that feeds back a result of operating the lighting apparatus 20 is, for example, when the user continues to operate the deformation interface 2 and gradually increasing illuminance reaches a maximum value, information for maintaining the maximum illuminance for a time set in advance (for example, 1 [s]). In addition, information that feeds back a result of operating the lighting apparatus 20 is, for example, when the user continues to operate the deformation interface 2 and gradually increasing illuminance reaches a maximum value, information for temporarily causing the lighting apparatus 20 to blink. Accordingly, the user of the lighting apparatus 20 is notified of the fact that the illuminance of light emitted by the lighting apparatus 20 has reached a maximum value and the user of the lighting apparatus 20 is provided with information that feeds back a result of operating the lighting apparatus 20.

In other words, information that feeds back a result of operating the lighting apparatus 20 is information that feeds back, to a visual sense or a tactile sense of the user, a result of the user's operation of the lighting apparatus 20 by operating the deformation interface 2.

As described above, the information transmitting unit 4 is configured to transmit, to the user, information in accordance with the external force detected by the external force sensor 3.

In this case, "the user" includes, in addition to a person who operates the deformation interface 2 that constitutes a switch of the lighting apparatus 20, a person who is present in the room where the lighting apparatus 20 is arranged and who is capable of recognizing a state of light emission of the light-emitting unit 41a or sound output from the sound output unit 41b.

<Operation of lighting apparatus>

Figure 7:
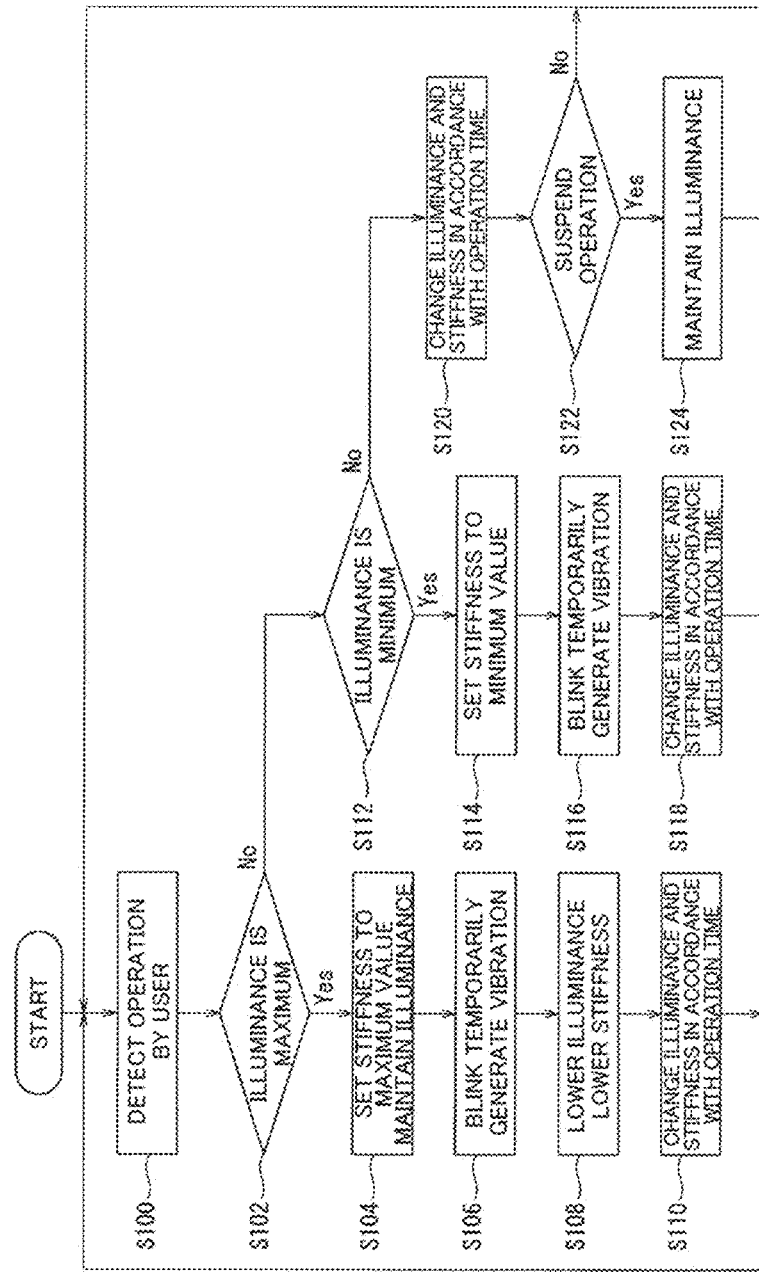
FIG. 7 is a flow chart representing an operation of the information provision system according to the first embodiment.

An example of an operation performed by the lighting apparatus 20 according to the first embodiment will now be described using FIG. 7 while also referring to FIGS. 1, 2, 3, 4, 5A, 5B, 5C, 5D, and 6. It should be noted that the operation described below starts in a state where the longer the deformation interface 2 is operated, the greater the increase in illuminance of light emitted by the lighting apparatus 20 and the greater the increase in stiffness of the deformation interface 2.

In step S100, the state changing unit 5 detects a present state (stiffness and shape) of the deformation interface 2 (the deforming portion 2a). Furthermore, the external force sensor 3 detects an operation of the deformation interface 2 by the user by detecting an external force applied to the deformation interface 2.

In step S102, the state change control unit 40 determines whether or not the illuminance of the lighting apparatus 20 is a maximum value. When it is determined that the illuminance of the lighting apparatus 20 is the maximum value (step S102: Yes), processing advances to step S104. On the other hand, when it is determined that the illuminance of the lighting apparatus 20 is not the maximum value (step S102: No), the processing advances to step S112.

In step S104, the state change control unit 40 maximizes the stiffness of the deformation interface 2 of which the height has been increased to the maximum value. In addition, the illuminance control unit 43 maintains the illuminance at the maximum value for a time set in advance (for example, 1 [s]).

In step S106, the illuminance control unit 43 temporarily causes the lighting apparatus 20 to blink. In addition, the state change control unit 40 performs control for shrinking the bulge of the deformation interface 2 in a short period of time and generates vibration in the deformation interface 2.

In step S108, the illuminance control unit 43 performs control such that the longer the deformation interface 2 is operated, the lower the illuminance of light emitted by the lighting apparatus 20. In addition, the state change control unit 40 performs control such that the longer the deformation interface 2 is operated, the lower the stiffness of the deformation interface 2.

In other words, in step S108, control is started in which the illuminance of light emitted by the lighting apparatus 20 and the stiffness of the deformation interface 2 change in an opposite direction with respect to the processing in steps S100 to S106.

In step S110, the illuminance control unit 43 performs control for changing the illuminance of light emitted by the lighting apparatus 20 in accordance with the time during which the deformation interface 2 is continuously operated. In addition, the state change control unit 40 performs control for changing the stiffness of the deformation interface 2 in accordance with the time during which the deformation interface 2 is continuously operated. Subsequently, the processing advances to step S100.

In step S112, the state change control unit 40 determines whether or not the illuminance of the lighting apparatus 20 is a minimum value. When it is determined that the illuminance of the lighting apparatus 20 is the minimum value (step S112: Yes), the processing advances to step S114. On the other hand, when it is determined that the illuminance of the lighting apparatus 20 is not the minimum value (step S112: No), the processing advances to step S120.

In step S114, the state change control unit 40 minimizes the stiffness of the deformation interface 2 of which the height has decreased to the minimum value.

In step S116, the illuminance control unit 43 temporarily causes the lighting apparatus 20 to blink. In addition, the state change control unit 40 performs control for shrinking the bulge of the deformation interface 2 in a short period of time and generates vibration in the deformation interface 2.

In step S118, the illuminance control unit 43 performs control for changing the illuminance of light emitted by the lighting apparatus 20 in accordance with the time during which the deformation interface 2 is continuously operated. In addition, the state change control unit 40 performs control for changing the stiffness of the deformation interface 2 in accordance with the time during which the deformation interface 2 is continuously operated. Subsequently, the processing advances to step S100.

In step S120, the illuminance control unit 43 performs control for changing the illuminance of light emitted by the lighting apparatus 20 in accordance with the time during which the deformation interface 2 is continuously operated. In addition, the state change control unit 40 performs control for changing the stiffness of the deformation interface 2 in accordance with the time during which the deformation interface 2 is continuously operated.

In step S122, the external force sensor 3 determines whether or not the operation of the deformation interface 2 by the user has been suspended by detecting an external force applied to the deformation interface 2. When it is determined that the operation of the deformation interface 2 has been suspended (step S122: Yes), the processing advances to step S124. On the other hand, when it is determined that the operation of the deformation interface 2 has not been suspended (step S122: No), the processing advances to step S100.

In step S124, the illuminance control unit 43 maintains the illuminance. Subsequently, the processing advances to step S100.

With the configuration according to the first embodiment, an electronic device capable of feeding back, using tactile sense, a result of a user operating the deformation interface 2 to the user as needed and an information provision system can be provided.

With the configuration according to the first embodiment, an electronic device capable of feeding back, using visual sense and auditory sense in addition to tactile sense, a result of a user operating the deformation interface 2 to the user as needed and an information provision system can be provided.

(Modification of First Embodiment)

While the state changing unit 5 adopts a configuration in which the state of the deforming portion 2*a* is changed using a fluid in the first embodiment, the configuration of the state changing unit 5 is not limited thereto and a configuration may be adopted in which the state of the deforming portion 2*a* is changed using an electromagnetic force.

In this case, compared to the configuration in which the state of the deforming portion 2*a* is changed using a fluid, response of control for changing the state of the deforming portion 2*a* can be improved.

While the state changing unit 5 adopts a configuration in which the state of the deforming portion 2*a* is changed using a gas in the first embodiment, the configuration of the state changing unit 5 is not limited thereto and a configuration may be adopted in which the state of the deforming portion 2*a* is changed using a liquid.

While the external force sensor 3 is formed using a mechanical pressure sensor in the first embodiment, the external force sensor 3 is not limited thereto and may be formed using, for example, an air pressure sensor.

The external force sensor 3 formed using an air pressure sensor is capable of detecting coordinates subjected to an external force along the Z direction that is perpendicular to the X direction and the Y direction in a similar manner to the external force sensor 3 formed using a mechanical pressure sensor.

Therefore, the external force sensor 3 formed using an air pressure sensor is capable of detecting a magnitude of an external force applied to the deformation interface 2.

Figure 8:
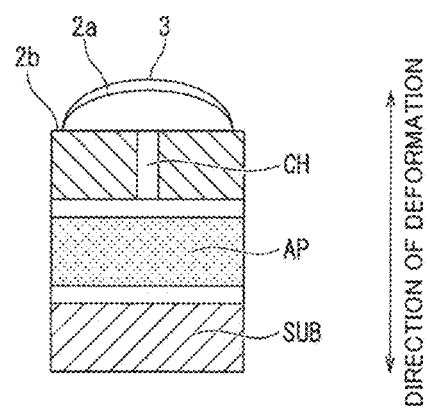
FIG. 8 is a diagram showing a modification of the first embodiment.

While the external force sensor 3 is formed using a mechanical pressure sensor in the first embodiment, the external force sensor 3 is not limited thereto and may be formed using, for example, a panel-like sensor arranged outside the deforming portion 2*a* as shown in FIG. 8. In this case, as the panel-like sensor, for example, an electrostatic panel or a pressure-sensitive panel can be used.

Specifically, the external force sensor 3 formed using an electrostatic panel indirectly detects an external force applied to the deformation interface 2. In addition, the external force sensor 3 formed using a pressure-sensitive panel directly detects an external force applied to the deformation interface 2.

The external force sensor 3 formed using a panel-like sensor is capable of detecting coordinates subjected to an external force along the X direction and the Y direction. Furthermore, the external force sensor 3 formed using an electrostatic panel is capable of detecting an external force along the Z direction as a binary of on or off. On the other hand, the external force sensor 3 formed using a pressure-sensitive panel is capable of detecting coordinates subjected to an external force along the Z direction with a higher resolution than when using an air pressure sensor.

Therefore, the external force sensor 3 formed using an electrostatic panel is capable of detecting a magnitude of an external force applied to the deformation interface 2 two-dimensionally along the X direction and the Y direction and, at the same time, detecting the external force along the Z direction as a binary of on or off.

In addition, the external force sensor 3 formed using a pressure-sensitive panel is capable of detecting a magnitude of an external force applied to the deformation interface 2 three-dimensionally along the X direction, the Y direction, and the Z direction.

Figure 9:
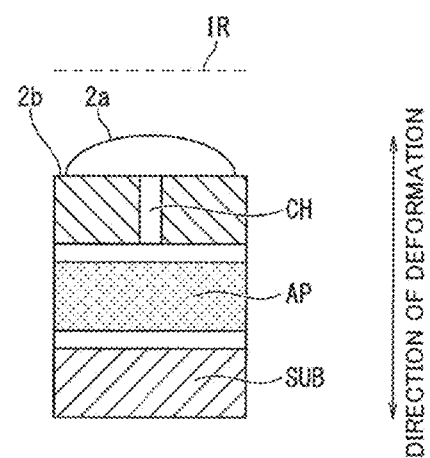
FIG. 9 is a diagram showing a modification of the first embodiment.

While the external force sensor 3 is formed using a mechanical pressure sensor in the first embodiment, the external force sensor 3 is not limited thereto and may be formed using, for example, an infrared sensor (not illustrated) arranged outside the deforming portion 2*a* as shown in FIG. 9. It should be noted that, in FIG. 9, infrared light output by the infrared sensor is depicted by a dashed line with a reference sign IR.

In other words, the external force sensor 3 formed using an infrared sensor indirectly detects an external force applied to the deformation interface 2.

The external force sensor 3 formed using an infrared sensor is capable of detecting coordinates subjected to an external force along the X direction, the Y direction, and the Z direction. In addition to the above, the external force sensor 3 formed using an infrared sensor is capable of detecting coordinates that could potentially be subjected to an external force along the Z direction at a time point where the user comes close to the deformation interface 2.

Specifically, the external force sensor 3 formed using an infrared sensor estimates a magnitude of the external force applied to the deformation interface 2 in accordance with a movement speed of an object moving toward the deformation interface 2 when the object passes the infrared light IR. Accordingly, the magnitude of the external force applied to the deformation interface 2 is detected by estimating that, for example, the higher the movement speed when the object passes the infrared light IR, the greater the magnitude of the external force applied to the deformation interface 2. In addition, when the movement speed when the object passes the infrared light IR is almost "0", it is estimated that the object does not come into contact with the deformation interface 2 and no external force is applied to the deformation interface 2.

Therefore, the external force sensor 3 formed using an infrared sensor is capable of detecting a magnitude of an external force applied to the deformation interface 2 three-dimensionally along the X direction, the Y direction, and the Z direction. In addition thereto, the external force sensor 3 formed using an infrared sensor is capable of estimating whether or not an external force is to be applied to the deformation interface 2 before the external force is applied to the deformation interface 2.

While the external force sensor 3 is formed by independently using only a mechanical pressure sensor in the first embodiment, the external force sensor 3 is not limited thereto and may be formed using, for example, a plurality of sensors such as a pressure sensor and an air pressure sensor. In other words, the external force sensor 3 may be formed by independently using various sensors such as a pressure sensor and an air pressure sensor or formed using a sensor unit that includes two or more of the various sensors. In addition, the external force sensor 3 may be configured to directly detect an external force applied to the deformation interface 2, configured to indirectly detect an external force applied to the deformation interface 2, or configured to directly and indirectly detect an external force applied to the deformation interface 2. Furthermore, the external force sensor 3 may be configured to quantitatively detect a magnitude and a direction of an external force applied to the deformation interface 2 or configured to simply detect whether or not an external force is applied to the deformation interface 2.

While the operation target device CM is configured to include the lighting apparatus 20 in the first embodiment, the operation target device CM is not limited thereto. Specifically, the operation target device CM may be configured to include an acoustic apparatus that outputs sound from a speaker. In this case, the acoustic apparatus is arranged indoors or outdoors and configured so as to be capable of changing a volume of output sound. Alternatively, the operation target device CM may be configured to include the lighting apparatus 20 and an acoustic apparatus.

While the information transmitting unit 4 is configured to include the state change control unit 40, the information output unit 41, the output information control unit 42, and the illuminance control unit 43 in the first embodiment, the information transmitting unit 4 is not limited thereto and may be configured to include only the state change control unit 40. In this case, the configuration of the information transmitting unit 4 does not include the information output unit 41 (the light-emitting unit 41a and the sound output unit 41b).

In the first embodiment, the illuminance control unit 43 is configured to control the illuminance of light emitted by the lighting apparatus 20 in accordance with an external force detected by the external force sensor 3 so as to provide the user of the lighting apparatus 20 with information that feeds back a result of operating the lighting apparatus 20. However, the configuration of the illuminance control unit 43 is not limited thereto and the illuminance control unit 43 may be configured to only control illuminance of light emitted by the lighting apparatus 20 in accordance with an external force detected by the external force sensor 3.

Second Embodiment

Figure 10:
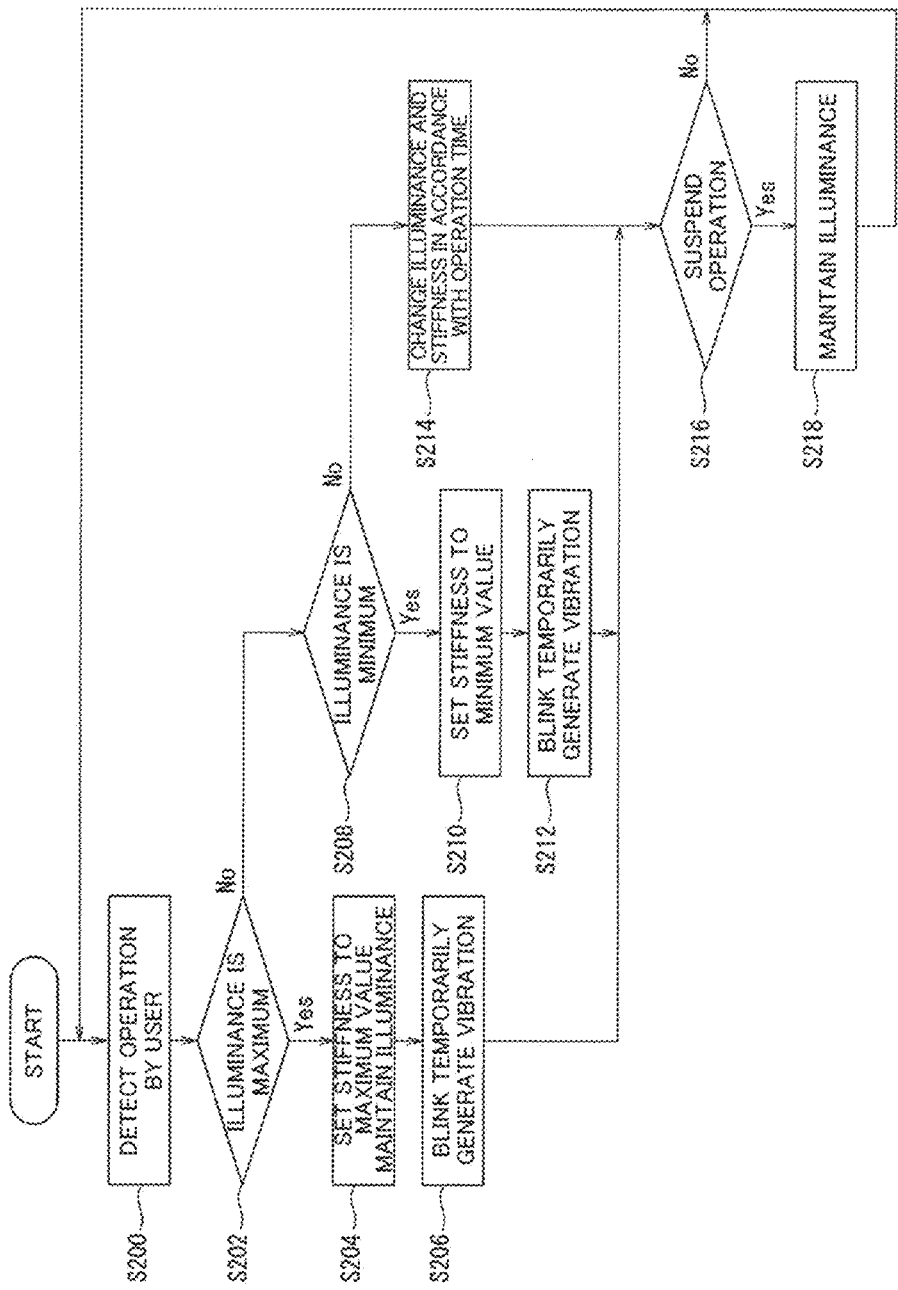
FIG. 10 is a flow chart representing an operation of an information provision system according to a second embodiment.

An electronic device 1 and a lighting apparatus 20 according to a second embodiment are also configured as shown in FIGS. 1, 2, 3, 4, 5A, 5B, 5C, 5D, and 6 and commonly share the configuration of the electronic device 1 and the lighting apparatus 20 according to the first embodiment. However, as shown in FIG. 10, the electronic device 1 and the lighting apparatus 20 according to the second embodiment differ from the first embodiment in an operation of the lighting apparatus 20.

<Operation of lighting apparatus>

An example of an operation performed by the lighting apparatus 20 according to the second embodiment will now be described using FIG. 10 while also referring to FIGS. 1, 2, 3, 4, 5A, 5B, 5C, 5D, and 6. It should be noted that the operation described below starts in a state where the longer a deformation interface 2 is operated, the greater the increase in illuminance of light emitted by the lighting apparatus 20 and the greater the increase in stiffness of the deformation interface 2.

In step S200, a state changing unit 5 detects a present state (stiffness and shape) of the deformation interface 2 (the deforming portion 2a). Furthermore, an external force sensor 3 detects an operation of the deformation interface 2 by the user by detecting an external force applied to the deformation interface 2.

In step S202, a state change control unit 40 determines whether or not the illuminance of the lighting apparatus 20 is a maximum value. When it is determined that the illuminance of the lighting apparatus 20 is the maximum value (step S202: Yes), processing advances to step S204. On the other hand, when it is determined that the illuminance of the lighting apparatus 20 is not the maximum value (step S202: No), the processing advances to step S208.

In step S204, the state change control unit 40 maximizes the stiffness of the deformation interface 2 of which the height has been increased to the maximum value. In addition, an illuminance control unit 43 maintains the illuminance at the maximum value for a time set in advance (for example, 1 [s]).

In step S206, the illuminance control unit 43 temporarily causes the lighting apparatus 20 to blink. In addition, the state change control unit 40 performs control for shrinking the bulge of the deformation interface 2 in a short period of time and generates vibration in the deformation interface 2. Subsequently, the processing advances to step S216.

In step S208, the state change control unit 40 determines whether or not the illuminance of the lighting apparatus 20 is a minimum value. When it is determined that the illuminance of the lighting apparatus 20 is the minimum value (step S208: Yes), the processing advances to step S210. On the other hand, when it is determined that the illuminance of the lighting apparatus 20 is not the minimum value (step S208: No), the processing advances to step S214.

In step S210, the state change control unit 40 minimizes the stiffness of the deformation interface 2 of which the height has decreased to the minimum value.

In step S212, the illuminance control unit 43 temporarily causes the lighting apparatus 20 to blink. In addition, the state change control unit 40 performs control for shrinking the bulge of the deformation interface 2 in a short period of time and generates vibration in the deformation interface 2. Subsequently, the processing advances to step S216.

In step S214, the illuminance control unit 43 performs control for changing the illuminance of light emitted by the lighting apparatus 20 in accordance with the time during which the deformation interface 2 is continuously operated. In addition, the state change control unit 40 performs control for changing the stiffness of the deformation interface 2 in accordance with the time during which the deformation interface 2 is continuously operated.

In step S216, the external force sensor 3 determines whether or not the operation of the deformation interface 2 by the user has been suspended by detecting an external force applied to the deformation interface 2. When it is determined that the operation of the deformation interface 2 has been suspended (step S216: Yes), the processing advances to step S218. On the other hand, when it is determined that the operation of the deformation interface 2 has not been suspended (step S216: No), the processing advances to step S200.

In step S218, the illuminance control unit 43 maintains the illuminance. Subsequently, the processing advances to step S200.

With the configuration according to the second embodiment, illuminance of light emitted by the lighting apparatus 20 and stiffness of the deformation interface 2 which continuously change in accordance with an operation of the deformation interface 2 by the user can be fed back to the user as needed.

Third Embodiment

Figure 11:
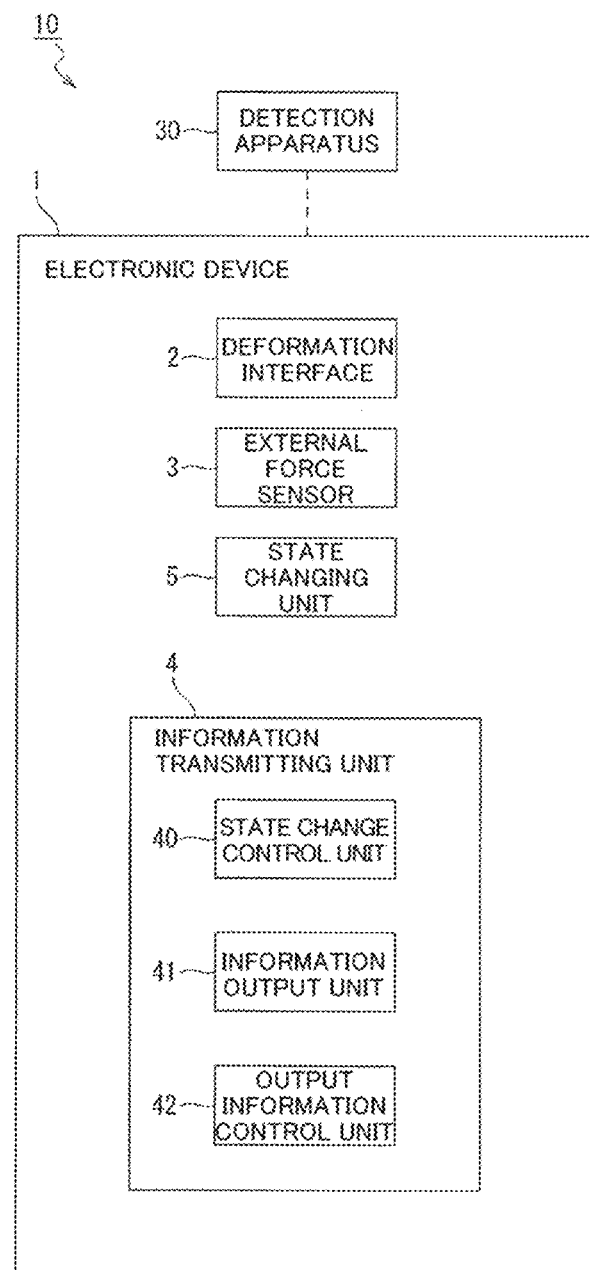
FIG. 11 is a block diagram showing a configuration of an information provision system and an electronic device according to a third embodiment.

As shown in FIG. 11, an electronic device 1 according to a third embodiment is built into an information provision system 10 that includes a detection apparatus 30. In the following description, descriptions of portions commonly shared with the first embodiment will be omitted.

The detection apparatus 30 is formed using, for example, an imaging apparatus such as a camera arranged indoors and is configured to detect an object existing in a range set in advance with respect to a periphery of a deformation interface 2.

An "object" is an object that moves such as a person or an animal.

As shown in FIG. 11, the electronic device 1 has a deformation interface 2, an external force sensor 3, a state changing unit 5, and an information transmitting unit 4.

Since configurations of the deformation interface 2, the external force sensor 3, and the state changing unit 5 are similar to the first embodiment, descriptions thereof will be omitted.

The information transmitting unit 4 includes a state change control unit 40, an information output unit 41, and an output information control unit 42.

The state change control unit 40 causes the state changing unit 5 to operate so as to change stiffness of the deformation interface 2 in accordance with an object detected by the detection apparatus 30. Specifically, when the object detected by the detection apparatus 30 is a person, for example, an age of the person detected as the object is estimated. In addition, when the estimated age exceeds a value set in advance (for example, age 18), the stiffness of the deformation interface 2 (a deforming portion 2a) is reduced. On the other hand, when the estimated age is equal to or lower than the value set in advance, the stiffness of the deformation interface 2 is increased.

Furthermore, for example, when the object detected by the detection apparatus 30 is an animal or a mobile vacuum cleaner, the stiffness of the deformation interface 2 is increased.

Figure 12:
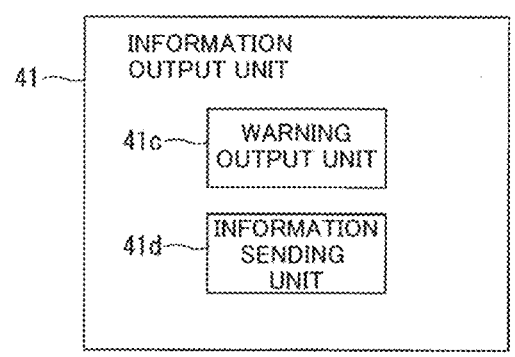
FIG. 12 is a block diagram showing a configuration of an information output unit.

As shown in FIG. 12, the information output unit 41 includes a warning output unit 41c and an information sending unit 41d.

The warning output unit 41c is formed using, for example, a speaker and is capable of outputting a warning.

A warning that can be output by the warning output unit 41c is, for example, a siren.

The information sending unit 41d is capable of transmitting information corresponding to an emergency to a point of contact set in advance through, for example, the Internet.

A "point of contact set in advance" is, for example, a portable information terminal carried by an owner of a building in which the information provision system 10 is arranged or a security company that covers the building.

Therefore, in the third embodiment, the "user" includes a person who is not present in the building in which the information provision system 10 is arranged.

The output information control unit 42 controls operations of the warning output unit 41c and the information sending unit 41d.

Specifically, when an operation of the deformation interface 2 is detected in a state where the stiffness of the deformation interface 2 has been lowered by the state change control unit 40, the warning output unit 41c is caused to output a warning and, at the same time, the information sending unit 41d is caused to transmit information.

<Operation of Information Provision System>

Figure 13:
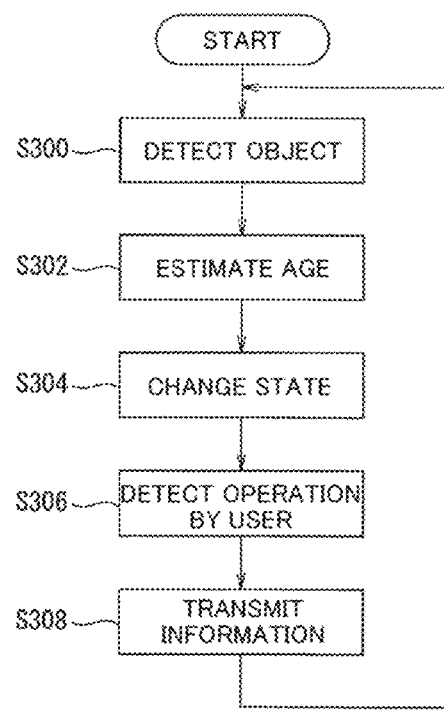
FIG. 13 is a flow chart representing an operation of the information provision system according to the third embodiment.

An example of an operation performed by the information provision system 10 according to the third embodiment will now be described using FIG. 13 while also referring to FIGS. 11 and 12. It should be noted that the operation to be described below starts in a state where the deformation interface 2 has a bulged shape such as a conical shape or a dome shape.

In step S300, the detection apparatus 30 detects an object existing in a range set in advance with respect to a periphery of the deformation interface 2.

In step S302, the state change control unit 40 estimates an age of the object detected in step S300.

In step S304, the state change control unit 40 changes the state of the deformation interface 2 in accordance with the age estimated in step S302. Specifically, when the age estimated in step S302 is equal to or lower than a value set in advance, the stiffness of the deformation interface 2 is increased. Accordingly, by making the deformation interface 2 too hard to press, information to the effect that operations of the deformation interface 2 are prohibited is fed back to the object detected in step S300. In other words, in step S304, when the age estimated in step S302 is equal to or lower than a value set in advance, output of a warning from the warning output unit 41c or transmission of information from the information sending unit 41d is prevented.

In step S306, the external force sensor 3 detects an operation of the deformation interface 2 by the user by detecting an external force applied to the deformation interface 2.

In step S308, in accordance with a detection result of the external force sensor 3 in step S306, the information transmitting unit 4 performs control for transmitting information to the user by causing the warning output unit 41c to output a warning and causing the information sending unit 41d to transmit information.

Subsequently, the processing advances to step S300.

With the configuration according to the third embodiment, a result of an operation of the deformation interface 2 can be fed back to the user as needed in accordance with the object detected by the detection apparatus 30.

(Modification of Third Embodiment)

While the stiffness of the deformation interface 2 is changed in accordance with the age of a person detected by the detection apparatus 30 in the third embodiment, a configuration is not limited thereto and the height of the deformation interface 2 may be changed in accordance with the age of a person detected by the detection apparatus 30. In this case, for example, when the estimated age exceeds a value set in advance, the height of the deformation interface 2 is increased, but when the estimated age is equal to or lower than the value set in advance, the height of the deformation interface 2 is reduced.

While the stiffness of the deformation interface 2 is changed in accordance with the age of a person detected by the detection apparatus 30 in the third embodiment, a configuration is not limited thereto. Specifically, for example, the detection apparatus 30 may be formed using a sensor capable of detecting a contact area when the object comes into contact with the deformation interface 2 and the state of the deformation interface 2 may be changed in accordance with the contact area detected by the object. In this case, for example, when it is estimated that the detected contact area corresponds to a hand of an adult, control for increasing the stiffness of the deformation interface 2 or control for increasing the height of the deformation interface 2 is performed. On the other hand, when the detected contact area is smaller than an area that corresponds to a hand of an adult, control for reducing the stiffness of the deformation interface 2 or control for lowering the height of the deformation interface 2 is performed. Therefore, the state change control unit 40 is configured to operate the state changing unit 5 so as to change stiffness of the deformation interface 2 in accordance with at least one of an external force detected by the external force sensor 3 and an object detected by the detection apparatus 30.

While the stiffness of the deformation interface 2 is changed in accordance with the age of a person detected by the detection apparatus 30 in the third embodiment, a configuration is not limited thereto. Specifically, for example, the face of a resident or a staff member of the building in which the information provision system 10 is arranged may be stored in advance, and when the face of a person detected by the detection apparatus 30 does not correspond to a face stored in advance, the state of the deformation interface 2 may be changed. In addition thereto, control may be performed for causing a warning to be output from the warning output unit 41c and, at the same time, causing information to be output from the information sending unit 41d.

Fourth Embodiment

Figure 14:
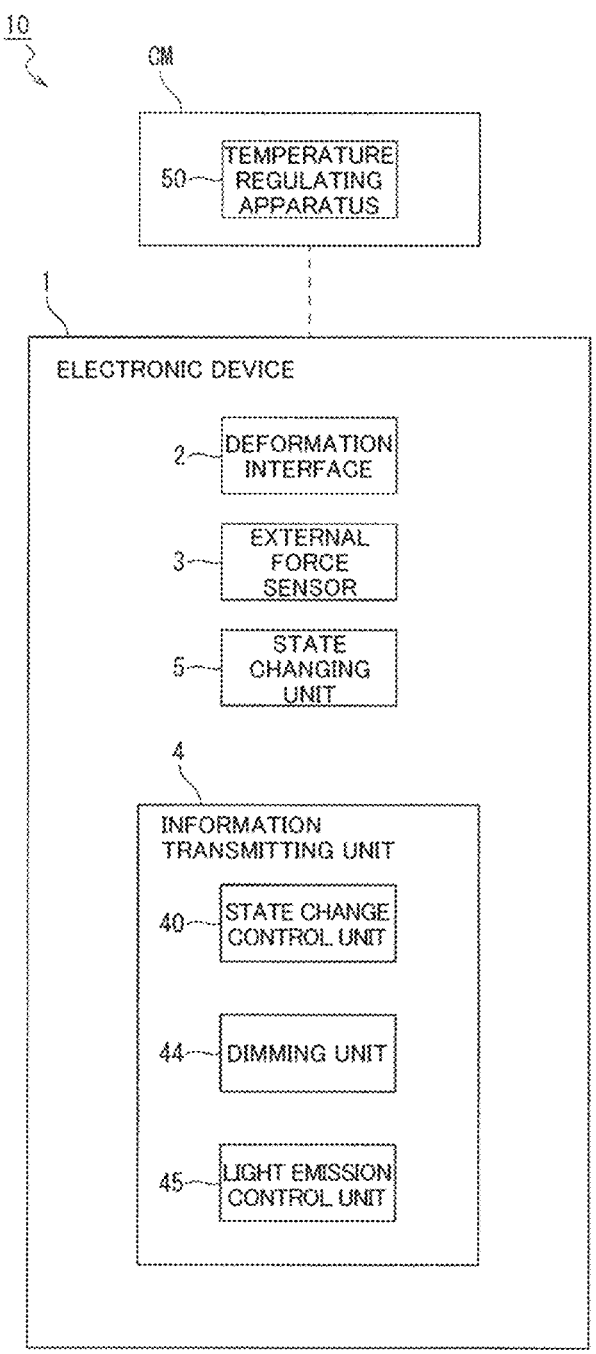
FIG. 14 is a block diagram showing a configuration of an information provision system and an electronic device according to a fourth embodiment.

As shown in FIG. 14, an electronic device 1 according to a fourth embodiment is built into an information provision system 10. In the following description, descriptions of portions commonly shared with the first embodiment will be omitted.

As shown in FIG. 14, the electronic device 1 has a deformation interface 2, an external force sensor 3, a state changing unit 5, and an information transmitting unit 4.

Since configurations of the deformation interface 2, the external force sensor 3, and the state changing unit 5 are similar to the first embodiment with the exception of the deformation interface 2 forming a switch for setting a temperature of a fluid with respect to a temperature regulating apparatus 50, descriptions thereof will be omitted.

The temperature regulating apparatus 50 is included in the operation target device CM and is formed using, for example, an air conditioner arranged indoors, and is capable of changing the temperature of a supplied fluid (gas).

It should be noted that the electronic device 1 according to the fourth embodiment has two deformation interfaces 2 as switches for adjusting the temperature. One of the two deformation interfaces 2 is a deformation interface (in the following description, sometimes described as a "heating interface") which forms a switch for raising the temperature. The other of the two deformation interfaces 2 is a deformation interface (in the following description, sometimes described as a "cooling interface") which forms a switch for lowering the temperature.

The information transmitting unit 4 includes a state change control unit 40, a dimming unit 44, and a light emission control unit 45.

The state change control unit 40 controls an operation of the state changing unit 5 in accordance with an external force detected by the external force sensor 3. Specifically, in a state where the heating interface is being operated, the height of the deformation interface 2 (a deforming portion 2a) is increased. Accordingly, the state change control unit 40 increases the height of the deformation interface 2 such that the greater the rise in indoor set temperature (temperature of supplied gas), the greater the height. On the other hand, in a state where the cooling interface is being operated, the height of the deformation interface 2 (the deforming portion 2a) is reduced. Accordingly, the state change control unit 40 reduces the height of the deformation interface 2 such that the greater the drop in indoor set temperature, the lower the height.

Furthermore, in a state where the indoor set temperature has reached a maximum value set to the temperature regulating apparatus 50, the state change control unit 40 maintains the state where the height of the deformation interface 2 has increased to a maximum value for a time set in advance (for example, 1 [s]). On the other hand, in a state where the indoor set temperature has reached a minimum value set to the temperature regulating apparatus 50, the state change control unit 40 maintains the state where the height of the deformation interface 2 has increased to a minimum value for a time set in advance.

In addition, for example, after the height of the deformation interface 2 has increased to a maximum value, control for maintaining a state where the stiffness of the deformation interface 2 has increased to a maximum value for a time set in advance may be performed.

The dimming unit 44 is formed using, for example, an LED and is capable of changing a state of light emission.

In addition, the dimming unit 44 is arranged inside the deformation interface 2 (the deforming portion 2*a*) in a state where a direction of light emission is oriented toward outside of the deformation interface 2.

The light emission control unit 45 controls a state of light emission of the dimming unit 44 in accordance with a temperature set by an operation of the heating interface or the cooling interface. Specifically, in a state where the heating interface is being operated, the dimming unit 44 is caused to emit light in a color of hues set in advance (for example, a warm color). In this case, control may be performed such that the higher the set temperature, the higher a luminosity of a color of light that is emitted by the dimming unit 44. Accordingly, the light emission control unit 45 increases the luminosity of the dimming unit 44 such that the greater the rise in indoor set temperature, the higher the luminosity. On the other hand, in a state where the cooling interface is being operated, the dimming unit 44 is caused to emit light in a color of hues set in advance (for example, a cool color). In this case, control may be performed such that the lower the set temperature, the lower the luminosity of a color of light that is emitted by the dimming unit 44. Accordingly, the light emission control unit 45 reduces the luminosity of the dimming unit 44 such that the greater the drop in indoor set temperature, the lower the luminosity. In addition, in a state where the indoor set temperature has reached a maximum value set to the temperature regulating apparatus 50, control for maintaining a state where the dimming unit 44 is emitting light in a color with a highest luminosity for a time set in advance may be performed. On the other hand, in a state where the indoor set temperature has reached a minimum value set to the temperature regulating apparatus 50, control for maintaining a state where the dimming unit 44 is emitting light in a color with a lowest luminosity for a time set in advance may be performed.

<Operation of Information Provision System>

Figure 15:
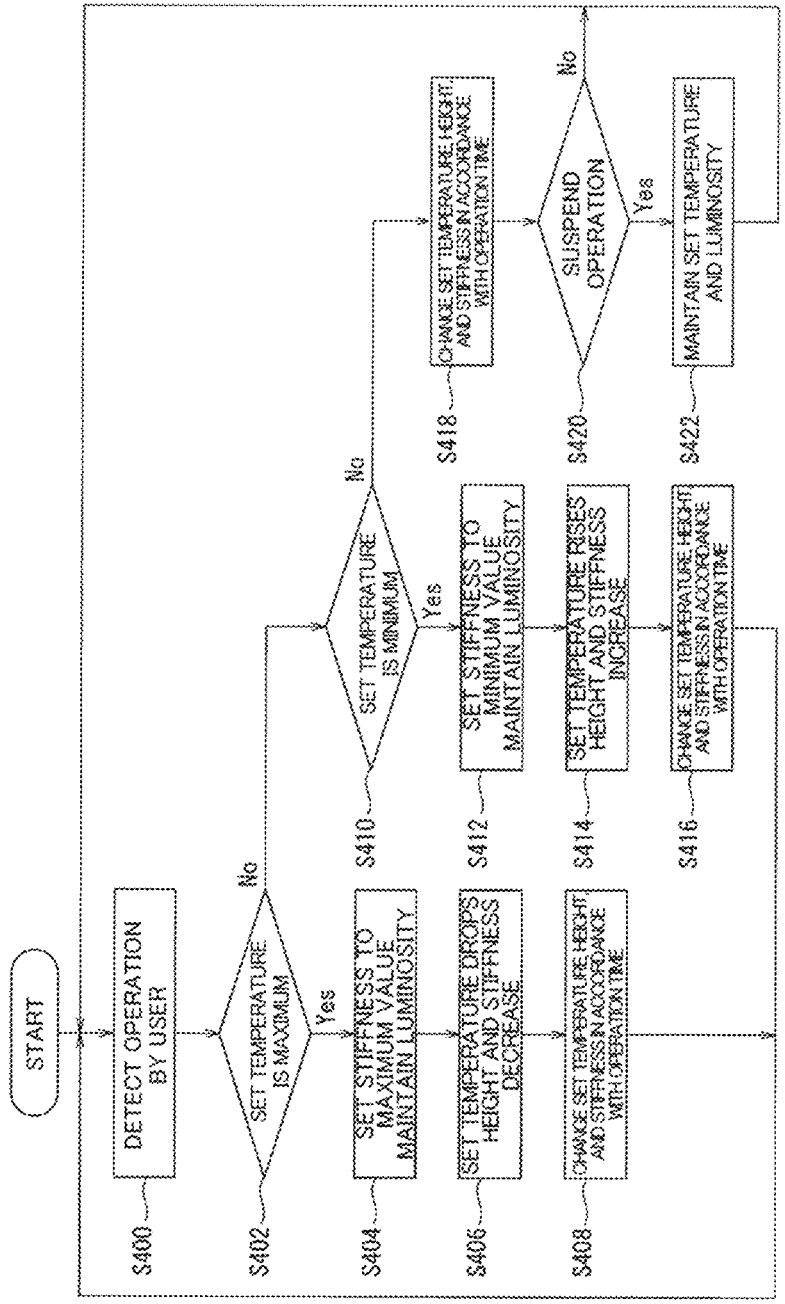
FIG. 15 is a flow chart representing an operation of the information provision system according to the fourth embodiment.

An example of an operation performed by the information provision system 10 according to the fourth embodiment will now be described using FIG. 15 while also referring to FIG. 14.

In step S400, the state changing unit 5 detects a present state (stiffness and shape) of the deformation interface 2 (the deforming portion 2*a*). Furthermore, the external force sensor 3 detects an operation of the deformation interface 2 by the user by detecting an external force applied to the deformation interface 2.

In step S402, the state change control unit 40 determines whether or not the indoor set temperature is the maximum value set to the temperature regulating apparatus 50. When it is determined that the set temperature is the maximum value (step S402: Yes), processing advances to step S404. On the other hand, when it is determined that the set temperature is not the maximum value (step S402: No), the processing advances to step S410.

In step S404, the state change control unit 40 maximizes the stiffness of the deformation interface 2 of which the height has been increased to the maximum value. In addition, the illuminance control unit 43 maintains a state where the dimming unit 44 is emitting light in a color with a highest luminosity for a time set in advance.

In step S406, the temperature regulating apparatus 50 performs control such that the longer the deformation interface 2 is operated, the lower the set temperature. In addition, the state change control unit 40 performs control such that the longer the deformation interface 2 is operated, the lower the height and stiffness of the deformation interface 2.

In other words, in step S406, control is started in which the set temperature and the height and the stiffness of the deformation interface 2 change in an opposite direction with respect to the processing in steps S400 to S404.

In step S408, the temperature regulating apparatus 50 performs control for changing the set temperature in accordance with the time during which the deformation interface 2 is continuously operated. In addition, the state change control unit 40 performs control for changing the height and the stiffness of the deformation interface 2 in accordance with the time during which the deformation interface 2 is continuously operated. Subsequently, the processing advances to step S400.

In step S410, the state change control unit 40 determines whether or not the indoor set temperature is the minimum value set to the temperature regulating apparatus 50. When it is determined that the set temperature is the minimum value (step S410: Yes), the processing advances to step S412. On the other hand, when it is determined that the set temperature is not the minimum value (step S410: No), the processing advances to step S418.

In step S412, the state change control unit 40 minimizes the stiffness of the deformation interface 2 of which the height has been increased to the minimum value. In addition, the illuminance control unit 43 maintains a state where the dimming unit 44 is emitting light in a color with a lowest luminosity for a time set in advance.

In step S414, the temperature regulating apparatus 50 performs control such that the longer the deformation interface 2 is operated, the lower the set temperature.

In addition, the state change control unit 40 performs control such that the longer the deformation interface 2 is operated, the lower the height and stiffness of the deformation interface 2.

In other words, in step S414, control is started in which the set temperature and the height and the stiffness of the deformation interface 2 change in an opposite direction with respect to the processing up to step S412.

In step S416, the temperature regulating apparatus 50 performs control for changing the set temperature in accordance with the time during which the deformation interface 2 is continuously operated. In addition, the state change control unit 40 performs control for changing the height and the stiffness of the deformation interface 2 in accordance with the time during which the deformation interface 2 is continuously operated. Subsequently, the processing advances to step S400.

In step S418, the temperature regulating apparatus 50 performs control for changing the set temperature in accordance with the time during which the deformation interface 2 is continuously operated. In addition, the state change control unit 40 performs control for changing the height and the stiffness of the deformation interface 2 in accordance with the time during which the deformation interface 2 is continuously operated.

In step S420, the external force sensor 3 determines whether or not the operation of the deformation interface 2 by the user has been suspended by detecting an external force applied to the deformation interface 2. When it is determined that the operation of the deformation interface 2 has been suspended (step S420: Yes), the processing advances to step S422. On the other hand, when it is determined that the operation of the deformation interface 2 has not been suspended (step S420: No), the processing advances to step S400.

In step S422, the temperature regulating apparatus 50 performs control for maintaining the set temperature. In addition, the state change control unit 40 performs control for maintaining the luminosity of the dimming unit 44. Subsequently, the processing advances to step S400.

With the configuration according to the fourth embodiment, a result of the temperature regulating apparatus 50 changing the temperature in accordance with the set temperature having been set by the user by operating the deformation interface 2 can be fed back to the user as needed.

(Modification of fourth embodiment)

While the temperature regulating apparatus 50 is formed using an air conditioner that is arranged indoors in the fourth embodiment, the temperature regulating apparatus 50 is not limited thereto and may be configured to include a thermostat or the like so as to be capable of changing water temperature.

Fifth Embodiment

Figure 16:
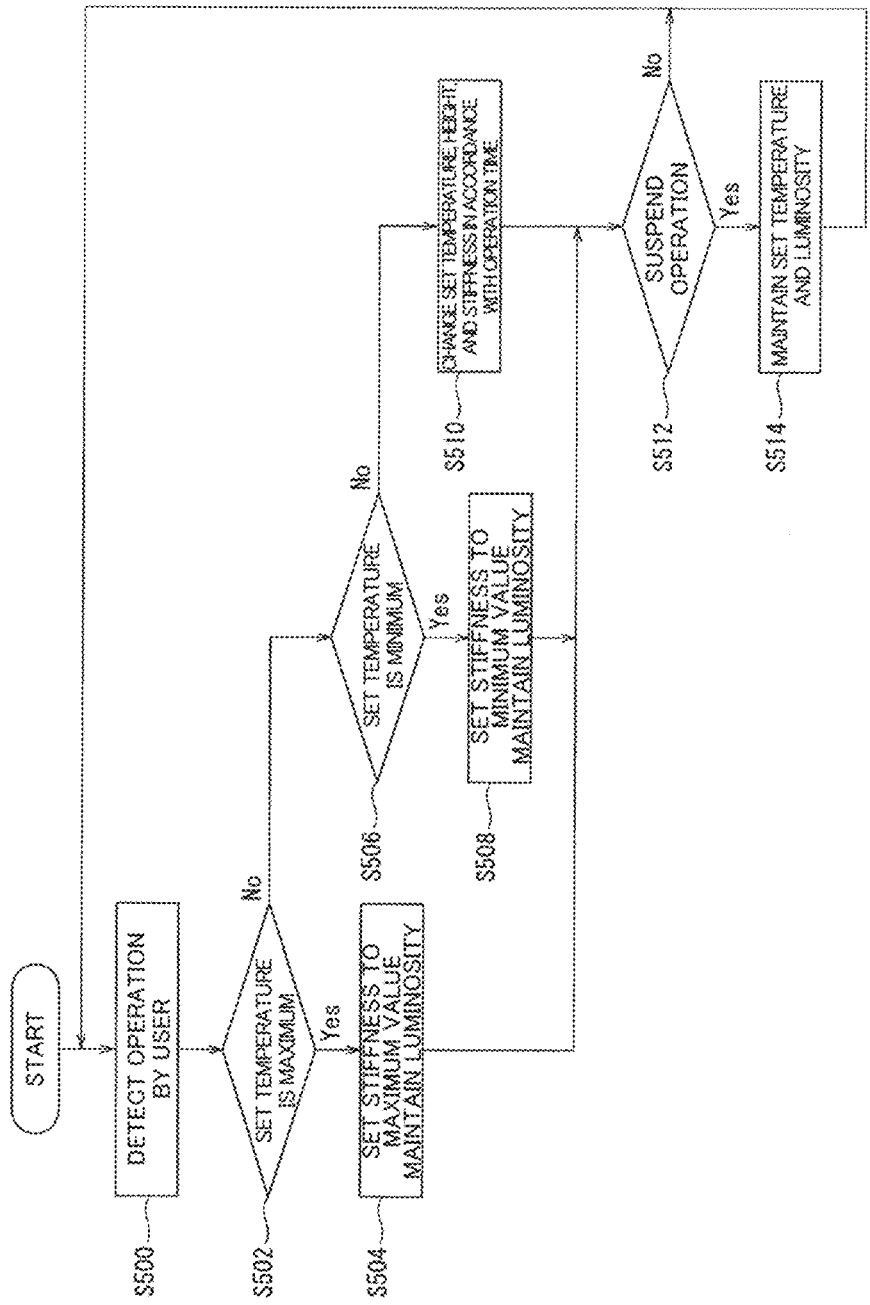
FIG. 16 is a flow chart representing an operation of an information provision system according to a fifth embodiment.

An electronic device 1 according to a fifth embodiment is also configured as shown in FIG. 14 and commonly shares the configuration of the electronic device 1 according to the fourth embodiment. However, the electronic device 1 according to the fifth embodiment differs from the fourth embodiment in an operation of an information provision system 10 as shown in FIG. 16.

<Operation of Information Provision System>

An example of an operation performed by the information provision system 10 according to the fifth embodiment will now be described using FIG. 16 while also referring to FIG. 14.

In step S500, a state changing unit 5 detects a present state (stiffness and shape) of a deformation interface 2 (a deforming portion 2a). Furthermore, an external force sensor 3 detects an operation of the deformation interface 2 by the user by detecting an external force applied to the deformation interface 2.

In step S502, a state change control unit 40 determines whether or not the indoor set temperature is the maximum value set to a temperature regulating apparatus 50. When it is determined that the set temperature is the maximum value (step S502: Yes), processing advances to step S504. On the other hand, when it is determined that the set temperature is not the maximum value (step S502: No), the processing advances to step S506.

In step S504, the state change control unit 40 maximizes the stiffness of the deformation interface 2 of which the height has been increased to the maximum value. In addition, an illuminance control unit 43 maintains a state where a dimming unit 44 is emitting light in a color with a highest luminosity for a time set in advance. Subsequently, the processing advances to step S512.

In step S506, the state change control unit 40 determines whether or not the illuminance of a lighting apparatus 20 is a minimum value. When it is determined that the illuminance of the lighting apparatus 20 is the minimum value (step S506: Yes), the processing advances to step S508. On the other hand, when it is determined that the illuminance of the lighting apparatus 20 is not the minimum value (step S506: No), the processing advances to step S510.

In step S508, the state change control unit 40 minimizes the stiffness of the deformation interface 2 of which the height has been increased to the minimum value. In addition, the illuminance control unit 43 maintains a state where the dimming unit 44 is emitting light in a color with a lowest luminosity for a time set in advance. Subsequently, the processing advances to step S512.

In step S510, the temperature regulating apparatus 50 performs control for changing the set temperature in accordance with the time during which the deformation interface 2 is continuously operated. In addition, the state change control unit 40 performs control for changing the height and the stiffness of the deformation interface 2 in accordance with the time during which the deformation interface 2 is continuously operated.

In step S512, the external force sensor 3 determines whether or not the operation of the deformation interface 2 by the user has been suspended by detecting an external force applied to the deformation interface 2. When it is determined that the operation of the deformation interface 2 has been suspended (step S512: Yes), the processing advances to step S514. On the other hand, when it is determined that the operation of the deformation interface 2 has not been suspended (step S512: No), the processing advances to step S500.

In step S512, the temperature regulating apparatus 50 performs control for maintaining the set temperature. In addition, the state change control unit 40 performs control for maintaining the luminosity of the dimming unit 44. Subsequently, the processing advances to step S500.

With the configuration according to the fifth embodiment, a result of the temperature regulating apparatus 50 changing the temperature which continuously changes in accordance with the set temperature having been set by the user by operating the deformation interface 2 can be fed back to the user as needed.

Sixth Embodiment

An electronic device according to a sixth embodiment is built into an information provision system 10 which presents a graphic.

Figure 17:
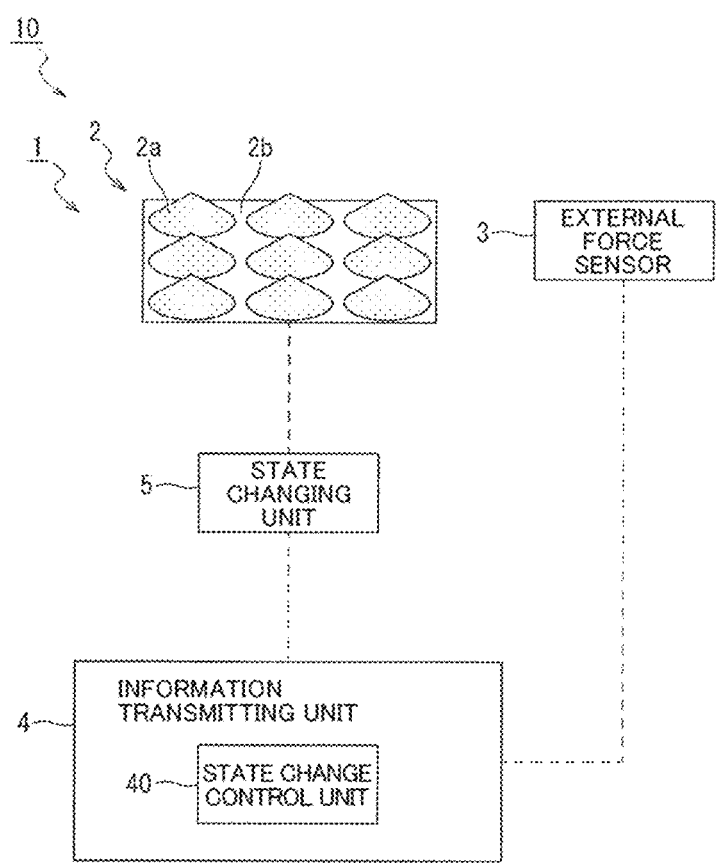
FIG. 17 is a diagram showing a configuration of an information provision system according to a sixth embodiment.
Figure 18:
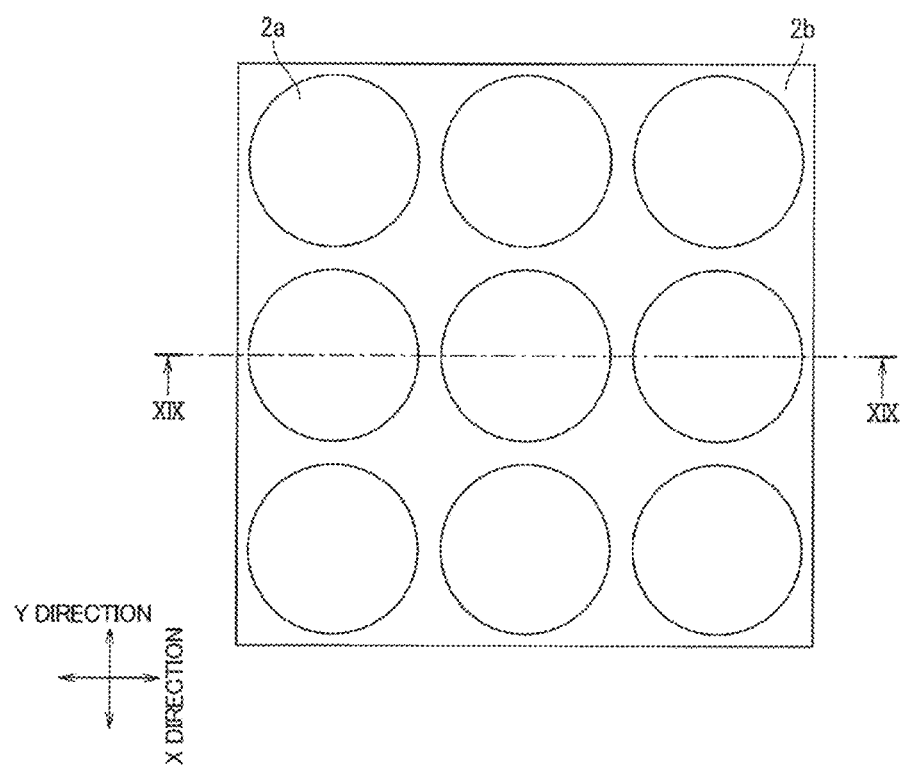
FIG. 18 is a plan view of a deformation interface included in an electronic device according to the sixth embodiment.
Figure 19:
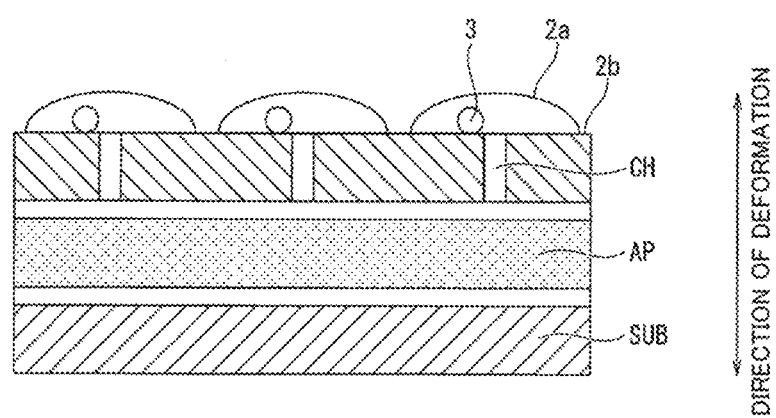
FIG. 19 is a sectional view taken along XIX-XIX in FIG. 18.

In addition, as shown in FIGS. 17 to 19, the electronic device according to the sixth embodiment has a plurality of deformation interfaces 2, a state changing unit 5, an external force sensor 3, and an information transmitting unit 4. In the following description, descriptions of portions commonly shared with the first embodiment will be omitted.

The plurality of deformation interfaces 2 are arranged in a grid pattern on a flat surface set in advance. While nine deformation interfaces 2 arranged at regular intervals are shown in the drawings, the number of the deformation interfaces 2 is not limited to nine.

A "flat surface set in advance" is, for example, a surface on which a sheet that forms the deformation interfaces 2 is placed and is a wall surface, an upper surface of a desk, or the like.

In addition, at least one of the plurality of deformation interfaces 2 forms a switch for operating an operation target device being a device to be a control target.

A "device to be a control target" is, for example, an acoustic reproduction apparatus, a video reproduction apparatus, or the like. In the sixth embodiment, a case where the device to be a control target is an acoustic apparatus will be described.

The information transmitting unit 4 includes a state change control unit 40. The state change control unit 40 is configured to control, in accordance with an option of operations of the deformation interfaces 2 that constitute a switch, an operation of the state changing unit 5 so that the plurality of deformation interfaces 2 being arranged in a grid pattern cause a user of the device to recognize a graphic. Specifically, when options such as "stop, play, fast-forward, and rewind" are set as operations of the acoustic apparatus being a device to be a control target, the operation of the state changing unit 5 is controlled so that a shape in accordance with a selectable operation is recognized in accordance with a present operation state.

Figure 20:
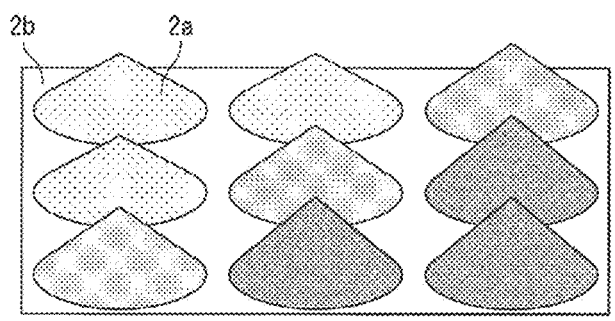
FIG. 20 is a diagram showing an example of an operation performed by a plurality of deformation interfaces.

Specifically, for example, when the present operation state is "stop" and selectable operations are "play, fast-forward, and rewind", the operation of the state changing unit 5 is controlled. In addition, by differentiating heights with respect to the plurality of deformation interfaces 2 arranged in a grid pattern, a graphic corresponding to the operation of "rewind" is formed using the plurality of deformation interfaces 2 as shown in FIG. 20. Accordingly, the operation of the state changing unit 5 is controlled so that the plurality of deformation interfaces 2 cause a user of the device to recognize the graphic corresponding to the operation of "rewind".

Figure 21:
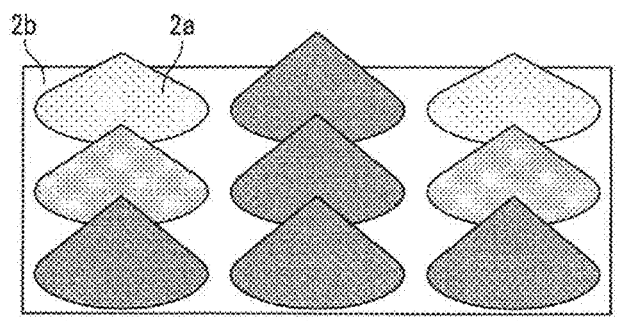
FIG. 21 is a diagram showing an example of an operation performed by a plurality of deformation interfaces.

In addition, for example, by differentiating heights with respect to the plurality of deformation interfaces 2 arranged in a grid pattern, a graphic corresponding to the operation of "play" is formed using the plurality of deformation interfaces 2 as shown in FIG. 21. Accordingly, the operation of the state changing unit 5 is controlled so that the plurality of deformation interfaces 2 cause a user of the device to recognize the graphic corresponding to the operation of "play".

<Operation of Information Provision System>

Figure 22:
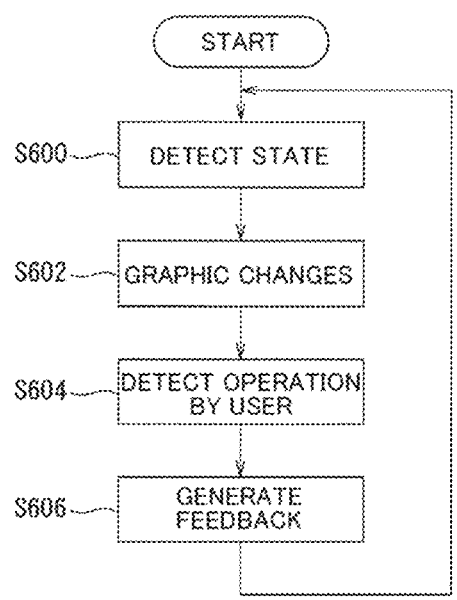
FIG. 22 is a flow chart representing an operation of the information provision system according to the sixth embodiment.

An example of an operation performed by the information provision system 10 according to the sixth embodiment will now be described using FIG. 22 while also referring to FIGS. 17 to 21. It should be noted that the operation to be described below starts in a state where the plurality of deformation interfaces 2 have a flat plate shape.

In step S600, the state change control unit 40 detects an operation being performed by the device.

In step S602, the state change control unit 40 controls, in accordance with the operation detected in step S600, an operation of the state changing unit 5 so that the plurality of deformation interfaces 2 being arranged in a grid pattern cause a user of the device to recognize a graphic. Accordingly, the graphic formed by the plurality of deformation interfaces 2 being arranged in a grid pattern is changed.

In step S604, with respect to the plurality of deformation interfaces 2 forming the graphic in step S602, the external force sensor 3 detects an operation of the deformation interfaces 2 by the user by detecting an external force applied to the deformation interfaces 2.

In step S606, the device performs an operation corresponding to the graphic formed in step S602. Subsequently, the processing advances to step S600.

With the configuration according to the sixth embodiment, a result of an operable option can be fed back to the user as needed by a graphic formed by the plurality of deformation interfaces 2 arranged in a grid pattern.

Seventh Embodiment

Figure 23:
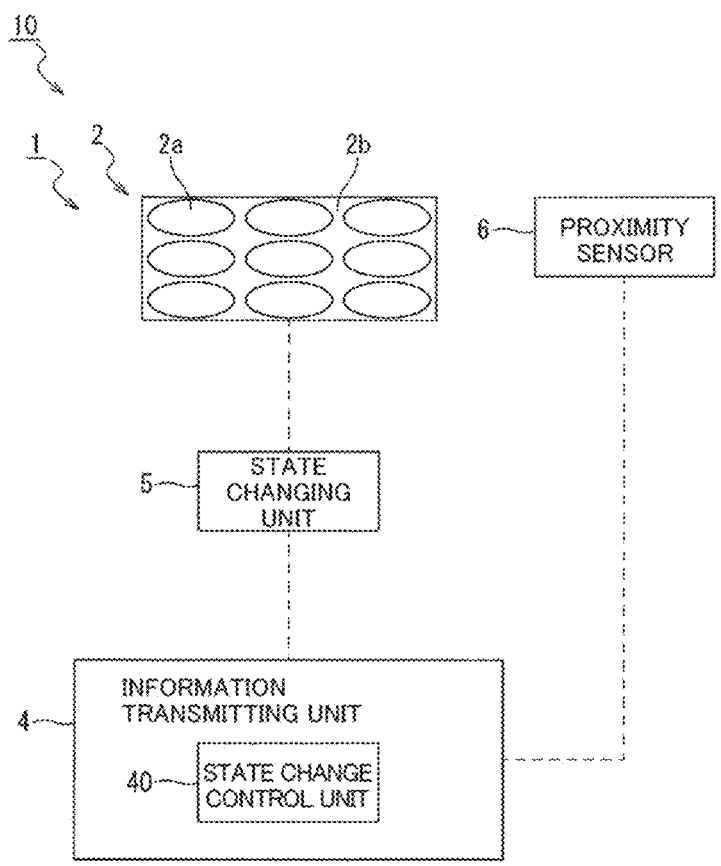
FIG. 23 is a diagram showing a configuration of an information provision system according to a seventh embodiment.

As shown in FIG. 23, an electronic device according to a seventh embodiment is built into an information provision system 10 that includes a proximity sensor 6.

The proximity sensor 6 is formed using, for example, an infrared sensor (not illustrated) arranged outside of a deforming portion 2*a* (refer to FIG. 9). In addition, the proximity sensor 6 is configured to detect an object that approaches a deformation interface 2.

An "object" is, for example, a finger, a hand, or the like of a person.

In addition, the electronic device according to the seventh embodiment has a plurality of deformation interfaces 2, a state changing unit 5, and an information transmitting unit 4. In the following description, descriptions of portions commonly shared with the first embodiment will be omitted.

The plurality of deformation interfaces 2 are arranged in a grid pattern on a flat surface set in advance in a state where the deformation interfaces 2 form a surface that is flush with the flat surface. While nine deformation interfaces 2 arranged at regular intervals are shown in the drawings, the number of the deformation interfaces 2 is not limited to nine.

A "flat surface set in advance" is, for example, a surface on which a sheet that forms the deformation interfaces 2 is placed and is a wall surface, an upper surface of a desk, or the like.

The information transmitting unit 4 includes a state change control unit 40.

The state change control unit 40 is configured to control an operation of the state changing unit 5 so that the deformation interfaces 2 protrude from the flat surface set in advance when the proximity sensor 6 detects an object.

In addition, the state change control unit 40 is configured to control an operation of the state changing unit 5 so that, when the proximity sensor 6 detects an object, the shorter a distance between the proximity sensor 6 and the object, the greater an amount by which the deformation interfaces 2 protrude.

As shown in 24, in the seventh embodiment, a case will be described in which a deformation interface 2 with respect to which the proximity sensor 6 has detected an object among the plurality of deformation interfaces 2 is caused to protrude more than the other deformation interfaces 2 from the flat surface.

In addition, the one protruding deformation interface 2 among the plurality of deformation interfaces 2 forms a switch for operating an operation target device being a device to be a control target.

A "device to be a control target" is, for example, an acoustic reproduction apparatus (an acoustic apparatus), a video reproduction apparatus (an image reproduction apparatus), a lighting apparatus, or the like.

<Operation of Information Provision System>

Figure 24:
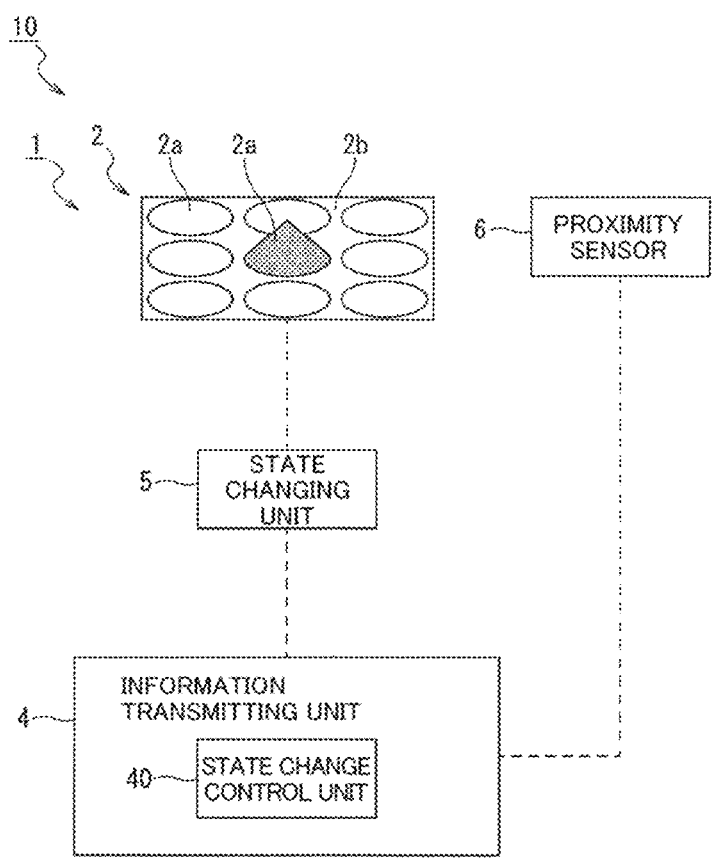
FIG. 24 is a diagram showing a configuration of the information provision system according to the seventh embodiment.
Figure 25:
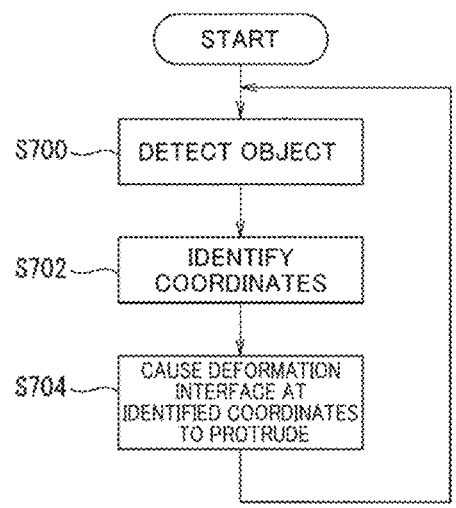
FIG. 25 is a flow chart representing an operation of the information provision system according to the seventh embodiment.

An example of an operation performed by the information provision system 10 according to the seventh embodiment will now be described using FIG. 25 while also referring to FIGS. 23 and 24. It should be noted that the operation to be described below starts in a state where all of the deformation interfaces 2 form a surface that is flush with the flat surface.

In step S700, the proximity sensor 6 detects an object.

In step S702, the state change control unit 40 identifies coordinates of the deformation interface 2 with respect to which the object has been detected in step S700 among the plurality of deformation interfaces 2 being arranged in a grid pattern.

In step S704, the state change control unit 40 causes the one deformation interface 2 of which coordinates have been identified in step S702 to protrude more than the other deformation interfaces 2 from the flat surface. Subsequently, the processing advances to step S700.

With the configuration according to the seventh embodiment, a switch for operating the device can be made to emerge at a position to which a hand of the user is brought close among the flat surface that is flush with a surface formed by the plurality of deformation interfaces 2 arranged in a grid pattern.

Eighth Embodiment

Figure 26:
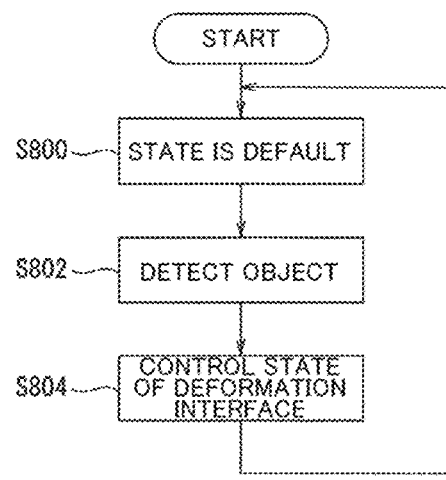
FIG. 26 is a flow chart representing an operation of an information provision system according to an eighth embodiment.

An electronic device 1 and an information provision system 10 according to an eighth embodiment are also configured as shown in FIG. 23 and commonly share the configurations of the electronic device 1 and the information provision system 10 according to the seventh embodiment. However, the electronic device 1 and the information provision system 10 according to the eighth embodiment differ from the seventh embodiment in an operation of a state change control unit 40 as shown in FIG. 26.

<Operation of Information Provision System>

An example of an operation performed by the information provision system 10 according to the eighth embodiment will now be described using FIG. 26 while also referring to FIGS. 23 and 24. It should be noted that the operation to be described below starts in a state where all deformation interfaces 2 form a surface that is flush with the flat surface.

In step S800, with respect to all of the deformation interfaces 2, the state change control unit 40 detects whether a state (shape and stiffness) assumes an initial value (default).

In step S802, a proximity sensor 6 detects an object.

In step S804, the state change control unit 40 causes the one deformation interface 2 with respect to which the object has been detected in step S802 to protrude more than the other deformation interfaces 2 from the flat surface. In addition, the state change control unit 40 differentiates the state of the deformation interface 2 having caused to protrude from the flat surface from the other deformation interfaces 2. Specifically, the state change control unit 40 controls an operation of the state changing unit 5 so that the shorter a distance between the proximity sensor 6 and the object, the greater an amount by which the deformation interface 2 protrudes and the greater the increase in stiffness of the deformation interface 2. Subsequently, the processing advances to step S700.

With the configuration according to the eighth embodiment, a switch for operating the device can be made to emerge at a position to which a hand of the user is brought close among the flat surface that is flush with a surface formed by the plurality of deformation interfaces 2 arranged in a grid pattern. In addition, the state of the deformation interface 2 having been caused to protrude from the flat surface can be made a state in accordance with a distance between the proximity sensor 6 and the object.

Other Embodiments

While the present technique has been described above in the form of embodiments, it is not to be understood that the descriptions and drawings that constitute parts of the disclosure limit the present technique. It is to be understood that various alternative embodiments, examples, and operable techniques will become apparent from the disclosure to those skilled in the art.

In addition, the present technique obviously includes various embodiments and the like that are not described herein such as configurations in which each configuration explained in the embodiments described above is arbitrarily applied. Therefore, the technical scope of the present technique is to be determined solely by matters specifying the invention according to the scope of claims that is reasonable from the description presented above.

Furthermore, the electronic device according to the present disclosure need not include all of the respective components explained in the embodiments and the like described above and, conversely, may include other components. The advantageous effects described in the present specification are merely exemplary and are not restrictive, and other advantageous effects may be produced.

The present technique can be configured as follows.

(1)

An electronic device, including: a deformation interface configured to change in shape by receiving an external force; an external force sensor configured to detect an external force applied to the deformation interface; and an information transmitting unit configured to transmit information in accordance with the external force detected by the external force sensor.

(2)

The electronic device according to (1) described above, wherein
the information transmitting unit includes an information output unit configured to output the information and an output information control unit configured to control the information output unit, and
the output information control unit is configured to control the information output unit to output information that enables an operation of an operation target device being a device that is a control target to be predicted or information in accordance with an operation of the device.

(3)

The electronic device according to (2) described above, wherein the information output unit includes a light-emitting unit of which a state of light emission is changeable, and
the output information control unit is configured to control the state of light emission.

(4)

The electronic device according to (2) or (3) described above, wherein the information output unit includes a sound output unit capable of outputting sound, and
the output information control unit is configured to control sound output from the sound output unit.

(5)

The electronic device according to any of (1) to (6) described above, further including a state changing unit configured to change a state of the deformation interface, wherein
the information transmitting unit includes a state change control unit configured to control an operation of the state changing unit,
the deformation interface is configured to form a switch for operating an operation target device being a device that is a control target, and
the state change control unit is configured to control an operation of the state changing unit in accordance with the external force detected by the external force sensor.

(6)

The electronic device according to (5) described above, wherein the state changing unit is configured to change a state of the deformation interface using a fluid.

(7)

The electronic device according to (5) described above, wherein the state changing unit is configured to change a state of the deformation interface using an electromagnetic force.

(8)

The electronic device according to any of (5) to (7) described above, wherein the state changing unit is configured to change at least one of stiffness and a shape of the deformation interface.

(9)

The electronic device according to any of (1) to (8) described above, wherein the information transmitting unit is configured to transmit, to a user, information in accordance with the external force.

(10)

An information provision system, including:

a deformation interface configured to form a switch for operating an operation target device being a device to be a control target, and configured to change in shape by receiving an external force;

an external force sensor configured to detect an external force applied to the deformation interface; and an information transmitting unit configured to transmit, to a user, information in accordance with the external force detected by the external force sensor.

(11)

The information provision system according to (10) described above, wherein the operation target device includes a lighting apparatus capable of changing illuminance of light to be emitted, the information transmitting unit includes an illuminance control unit configured to control the illuminance in accordance with an external force detected by the external force sensor, and the illuminance control unit is configured to control the illuminance in accordance with the external force detected by the external force sensor so that a user of the lighting apparatus is provided with information for feeding back a result of operating the lighting apparatus.

(12)

The information provision system according to (11) described above, further including a state changing unit configured to change a shape of the deformation interface and a state change control unit configured to control an operation of the state changing unit, wherein the state change control unit is configured to control an operation of the state changing unit in accordance with the external force detected by the external force sensor so that the user is provided with information for feeding back a result of operating the lighting apparatus.

(13)

An information provision system, including:

a deformation interface configured to form a switch for operating an operation target device being a device to be a control target, and configured to change in shape by receiving an external force;

an external force sensor configured to detect an external force applied to the deformation interface;

a state changing unit configured to change the shape of the deformation interface; a state change control unit configured to control an operation of the state changing unit; and a detection apparatus configured to detect an object existing in a range set in advance in a periphery of the deformation interface, wherein the state change control unit is configured to operate the state changing unit so as to change stiffness of the deformation interface in accordance with at least one of an external force detected by the external force sensor and an object detected by the detection apparatus.

(14)

An information provision system, including:

a deformation interface configured to form a switch for setting, with respect to a temperature regulating apparatus capable of changing a temperature of a fluid to be supplied, a temperature of the fluid, and configured to change in shape by receiving an external force;

an external force sensor configured to detect an external force applied to the deformation interface;

a state changing unit configured to change the shape of the deformation interface;

a state change control unit configured to control an operation of the state changing unit;

a dimming unit capable of changing a state of light emission of the deformation interface;

a light emission control unit configured to control the dimming unit; and a light emission control unit configured to control the state of light emission in accordance with the set temperature.

(15)

An information provision system, including:

a plurality of deformation interfaces being arranged in a grid pattern on a flat surface set in advance and configured to change in shape by receiving an external force;

an external force sensor configured to detect an external force applied to the deformation interfaces;

a state changing unit configured to change the shape of the deformation interfaces; and a state change control unit configured to control an operation of the state changing unit, wherein at least one of the plurality of deformation interfaces is configured to form a switch for operating an operation target device being a device to be a control target, and the state change control unit is configured to control, in accordance with an option of the operation, an operation of the state changing unit so that the plurality of deformation interfaces being arranged in a grid pattern cause a user of the device to recognize a graphic.

(16)

An information provision system, including:

a deformation interface arranged on a flat surface set in advance in a state where a surface that is flush with the flat surface is formed, and configured to change in shape by receiving an external force;

a state changing unit configured to change the shape of the deformation interface;

a state change control unit configured to control an operation of the state changing unit; and a proximity sensor configured to detect an object that approaches the deformation interface, wherein the state change control unit is configured to control an operation of the state changing unit so that the deformation interface protrudes from the flat surface when the proximity sensor detects the object, and the protruding deformation interface is configured to form a switch for operating an operation target device being a device to be a control target.

(17)

The information provision system according to (16) described above, including a plurality of the deformation interfaces being arranged in a grid pattern on the flat surface in a state where a surface that is flush with the flat surface is formed, wherein the state change control unit controls an operation of the state changing unit so that, when the proximity sensor detects the object, a deformation interface with respect to which the proximity sensor has detected the object among the plurality of deformation interfaces is caused to protrude more than the other deformation interfaces from the flat surface.

REFERENCE SIGNS LIST

1 Electronic device
2 Deformation interface
2a Deforming portion
2b Flat plate portion
3 External force sensor
4 Information transmitting unit
5 State changing unit
6 Proximity sensor
10 Information provision system
20 Lighting apparatus
30 Detection apparatus
40 State change control unit
41 Information output unit
41a Light-emitting unit
41b Sound output unit
41c Warning output unit
41d Information sending unit
42 Output information control unit
43 Illuminance control unit
44 Dimming unit
45 Light emission control unit
50 Temperature regulating apparatus
CM Operation target device
AP Air pump
CH Flow channel
SUB Substrate
IR Infrared light

The invention claimed is:

1. An electronic device, comprising:
a deformation interface that includes a deforming portion and a flat plate portion around the deforming portion, wherein the deforming portion is configured to change in shape by reception of an external force;
an external force sensor in the deforming portion of the deformation interface, wherein the external force sensor is configured to detect the external force applied to the deformation interface; and
an information transmitting unit configured to transmit first information based on the external force detected by the external force sensor.

2. The electronic device according to claim 1, wherein the information transmitting unit is further configured to transmit, to a user, the first information based on the external force.

3. The electronic device according to claim 1, further comprising a state changing unit configured to change a state of the deforming portion, wherein
the information transmitting unit includes a state change control unit,
the deformation interface is configured to form a switch to operate an operation target device, and
the state change control unit is configured to control an operation of the state changing unit based on the external force detected by the external force sensor.

4. The electronic device according to claim 3, wherein the state changing unit is further configured to change at least one of stiffness or the shape of the deforming portion.

5. The electronic device according to claim 4, wherein the state changing unit is further configured to change the state of the deforming portion using a fluid.

6. The electronic device according to claim 4, wherein the state changing unit is further configured to change the state of the deforming portion using an electromagnetic force.

7. The electronic device according to claim 1, wherein the information transmitting unit includes
an information output unit configured to output the first information, and
an output information control unit configured to control the information output unit to output at least one of the first information that enables an operation of an operation target device or second information that is based on the operation of the operation target device.

8. The electronic device according to claim 7, wherein the information output unit includes a light-emitting unit of which a state of light emission is changeable, and
the output information control unit is further configured to control the state of light emission.

9. The electronic device according to claim 7, wherein the information output unit includes a sound output unit configured to output sound, and
the output information control unit is further configured to control the output of the sound from the sound output unit.

10. An information provision system, comprising:
a deformation interface configured to form a switch to operate an operation target device, wherein
the deformation interface includes a deforming portion and a flat plate portion around the deforming portion, and
the deforming portion is configured to change in shape by reception of an external force;
an external force sensor configured to detect the external force applied to the deformation interface; and
an information transmitting unit configured to transmit, to a user, information based on the external force detected by the external force sensor.

11. The information provision system according to claim 10, wherein
the operation target device includes a lighting apparatus capable of changing illuminance of light to be emitted, and
the information transmitting unit includes an illuminance control unit configured to control the illuminance based on the detected external force so that the user of the lighting apparatus is provided with the information to feed back a result of operation of the lighting apparatus.

12. The information provision system according to claim 11, further comprising
a state changing unit configured to change the shape of the deforming portion; and
a state change control unit configured to control an operation of the state changing unit based on the detected external force so that the user is provided with the information.

13. An information provision system, comprising:
a deformation interface configured to form a switch to operate an operation target device, wherein
the deformation interface includes a deforming portion and a flat plate portion around the deforming portion, and
the deforming portion is configured to change in shape by reception of an external force;
an external force sensor configured to detect the external force applied to the deformation interface;
a state changing unit configured to change the shape of the deforming portion;

a state change control unit configured to control an operation of the state changing unit; and a detection apparatus configured to detect an object existing in a range set in advance in a periphery of the deformation interface, wherein
the state change control unit is further configured to operate the state changing unit to change stiffness of the deforming portion, and
the change in the stiffness is based on at least one of the external force detected by the external force sensor or the object detected by the detection apparatus.

14. An information provision system, comprising:
a deformation interface configured to form a switch to set, with respect to a temperature regulating apparatus capable of changing a temperature of a fluid to be supplied, the temperature of the fluid, wherein
the deformation interface includes a deforming portion and a flat plate portion around the deforming portion, and
the deforming portion is configured to change in shape by reception of an external force;
an external force sensor configured to detect the external force applied to the deformation interface;
a state changing unit configured to change the shape of the deforming portion;
a state change control unit configured to control an operation of the state changing unit;
a dimming unit configured to change a state of light emission of the deformation interface; and
a light emission control unit configured to control the state of light emission based on the set temperature.

15. An information provision system, comprising:
a plurality of deformation interfaces in a grid pattern on a flat surface set in advance, wherein
each of the plurality of deformation interfaces includes a deforming portion and a flat plate portion around the deforming portion, and
the deforming portion is configured to change in shape by reception of an external force;
an external force sensor configured to detect the external force applied to the plurality of deformation interfaces;

a state changing unit configured to change the shape of the deforming portion, wherein at least one of the plurality of deformation interfaces is configured to form a switch to operate an operation target device; and a state change control unit configured to control an operation of the state changing unit so that the plurality of deformation interfaces causes a user of the operation target device to recognize a graphic.

16. An information provision system, comprising:
a deformation interface on a flat surface set in advance in a state where a surface that is flush with the flat surface is formed, wherein the deformation interface is configured to change in shape by reception of an external force;
a state changing unit configured to change the shape of the deformation interface;
a proximity sensor configured to detect an object that approaches the deformation interface; and
a state change control unit configured to control an operation of the state changing unit so that the deformation interface protrudes, based on the detection of the object, from the flat surface, wherein the protruded deformation interface is configured to form a switch to operate an operation target device being a device to be a control target.

17. The information provision system according to claim 16, further comprising a plurality of deformation interfaces in a grid pattern on the flat surface in the state where the surface that is flush with the flat surface is formed, wherein
the plurality of deformation interfaces includes the deformation interface, and
the state change control unit is further configured to control the operation of the state changing unit so that, based on the detection of the object, the deformation interface with respect to which the proximity sensor has detected the object among the plurality of deformation interfaces is caused to protrude from the flat surface more than remaining deformation interfaces of the plurality of deformation interfaces.

* * * * *